US011933933B2

(12) United States Patent
Iguchi

(10) Patent No.: US 11,933,933 B2
(45) Date of Patent: Mar. 19, 2024

(54) EVENT DETECTION METHOD, EVENT DETECTION SYSTEM, AND NON-TRANSITORY COMPUTER-READABLE RECORDING MEDIUM

(71) Applicant: Asahi Kasei Microdevices Corporation, Tokyo (JP)

(72) Inventor: Kazuyuki Iguchi, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 17/694,611

(22) Filed: Mar. 14, 2022

(65) Prior Publication Data

US 2022/0317329 A1 Oct. 6, 2022

(30) Foreign Application Priority Data

Mar. 31, 2021 (JP) ................................ 2021-060058
Jan. 7, 2022 (JP) ................................ 2022-001938

(51) Int. Cl.
*G01V 3/38* (2006.01)

(52) U.S. Cl.
CPC .................................... *G01V 3/38* (2013.01)

(58) Field of Classification Search
CPC .... G01D 5/142; G01D 5/145; G01R 33/0206; G01R 33/07; G01R 33/072
See application file for complete search history.

(56) References Cited

U.S. PATENT DOCUMENTS

| | | | | |
|---|---|---|---|---|
| 2009/0160433 | A1* | 6/2009 | Oberhoffner | G01D 5/145 324/207.13 |
| 2013/0027028 | A1* | 1/2013 | Hohe | G01D 5/145 324/207.11 |
| 2015/0247719 | A1 | 9/2015 | Huang | |
| 2019/0101372 | A1* | 4/2019 | May | G01B 7/14 |
| 2020/0096367 | A1 | 3/2020 | Kitaura | |
| 2021/0199730 | A1* | 7/2021 | Close | G01R 33/038 |

FOREIGN PATENT DOCUMENTS

| | | | |
|---|---|---|---|
| JP | H08152301 | A | 6/1996 |
| JP | 2003167627 | A | 6/2003 |
| JP | 2017219320 | A | 12/2017 |

* cited by examiner

*Primary Examiner* — Son T Le
*Assistant Examiner* — Adam S Clarke

(57) ABSTRACT

Provided is an event detection method comprising: obtaining an event occurrence position based on a magnetic field detected by a magnetic sensor; selecting a detection axis for event detection based on the event occurrence position; calculating a trigger threshold value according to the event occurrence position on the detection axis; and obtaining a trigger signal indicating that the magnetic field detected by the magnetic sensor and the trigger threshold value meet a predefined condition.

18 Claims, 27 Drawing Sheets

MAGNETIC FLUX DENSITY
Bz_1
Bthz
Bz_0
Bz
POSITION
TRIGGER GENERATION POSITION
REFERENCE POSITION

100

EVENT DETECTION METHOD, EVENT DETECTION SYSTEM, AND NON-TRANSITORY COMPUTER-READABLE RECORDING MEDIUM

The contents of the following Japanese patent application (s) are incorporated herein by reference:
NO. 2021-060058 filed in JP on Mar. 31, 2021, and
NO. 2022-001938 filed in JP on Jan. 7, 2022

BACKGROUND

1. Technical Field

The present invention relates to an event detection method, an event detection system, and a non-transitory computer-readable recording medium.

2. Related Art

Patent Document 1 describes "to provide a position sensor with which it is possible to detect the movement of a detection object by one detection unit even when the amount of movement of the detection object increases". Patent Document 2 describes "to provide a position detecting sensor, whose output has linearity against a long detection distance, capable of executing position detection with high detecting precision".

PRIOR ART DOCUMENTS

Patent Documents

Patent Document 1: Japanese Patent Application Publication No. 2019-2835
Patent Document 2: Japanese Patent Application Publication No. 2003-167627

DESCRIPTION OF EXEMPLARY EMBODIMENTS

Hereinafter, the present invention will be described through embodiments of the invention, but the following embodiments do not limit the claimed invention. Moreover, not all combinations of features described in the embodiments are necessary to solutions of the invention.

Figure 1A:
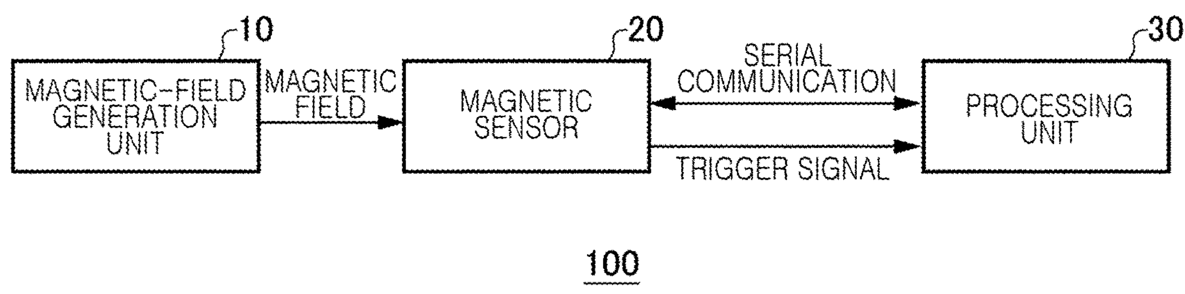
FIG. 1A is a block diagram showing an overview of an event detection system 100.

FIG. 1A is a block diagram showing an overview of an event detection system 100. The event detection system 100 is provided with a magnetic-field generation unit 10, a magnetic sensor 20, and a processing unit 30.

The magnetic-field generation unit 10 generates a predetermined magnetic field. For example, the magnetic-field generation unit 10 includes a bipolar magnet composed of a north pole and a south pole arrayed in a predetermined direction. The magnetic-field generation unit 10 generates, according to a magnetizing direction of the magnet, a magnetic field having a predetermined magnetic field waveform. The magnetic-field generation unit 10 may move in a predetermined direction to change the magnetic field waveform.

The magnetic sensor 20 detects the magnetic field generated by the magnetic-field generation unit 10. The magnetic sensor 20 detects a magnetic field of at least two or more detection axes. The magnetic sensor 20 in this example is a multiaxial magnetic sensor capable of detecting a magnetic field of two or more axes. However, the magnetic sensor 20 may have a plurality of uniaxial sensors and thereby detect the magnetic field of two or more axes. The magnetic sensor 20 obtains measurement data obtained by detecting a magnetic flux density of the magnetic field of two or more axes. The magnetic sensor 20 generates a trigger signal when the obtained measurement data meets a predetermined condition. The trigger signal is an interrupt signal that notifies change in a state of the magnetic sensor 20.

The processing unit 30 processes a signal detected by the magnetic sensor 20. The processing unit 30 serially communicates with the magnetic sensor 20 and receives the measurement data from the magnetic sensor 20. Moreover, the processing unit 30 changes an internal state by the trigger signal from the magnetic sensor 20. For example, the processing unit 30 changes, in response to reception of the trigger signal, a state of a device provided with the processing unit 30 from a standby state to an activated state.

The event detection system 100 generates the trigger signal based on detection of an event according to relative positional relationship between the magnetic-field generation unit 10 and the magnetic sensor 20. The event detection system 100 in this example generates the trigger signal in response to movement of the magnetic-field generation unit 10 to a predetermined position, to execute a predetermined operation.

In an example, the event detection system 100 is equipped on a mobile terminal such as a smartphone whose display can be expanded and contracted (a rollable phone, for example), and outputs the trigger signal for switching display on the display in response to expansion and contraction of the display to a predetermined position. Moreover, the event detection system 100 may switch a state of a smartphone from a standby state to an activated state in response to the detection of an event. Moreover, the event detection system 100 may make transition of the state of the smartphone from the activated state to the standby state when there is no operation executed for a predetermined period of time.

Figure 1B:
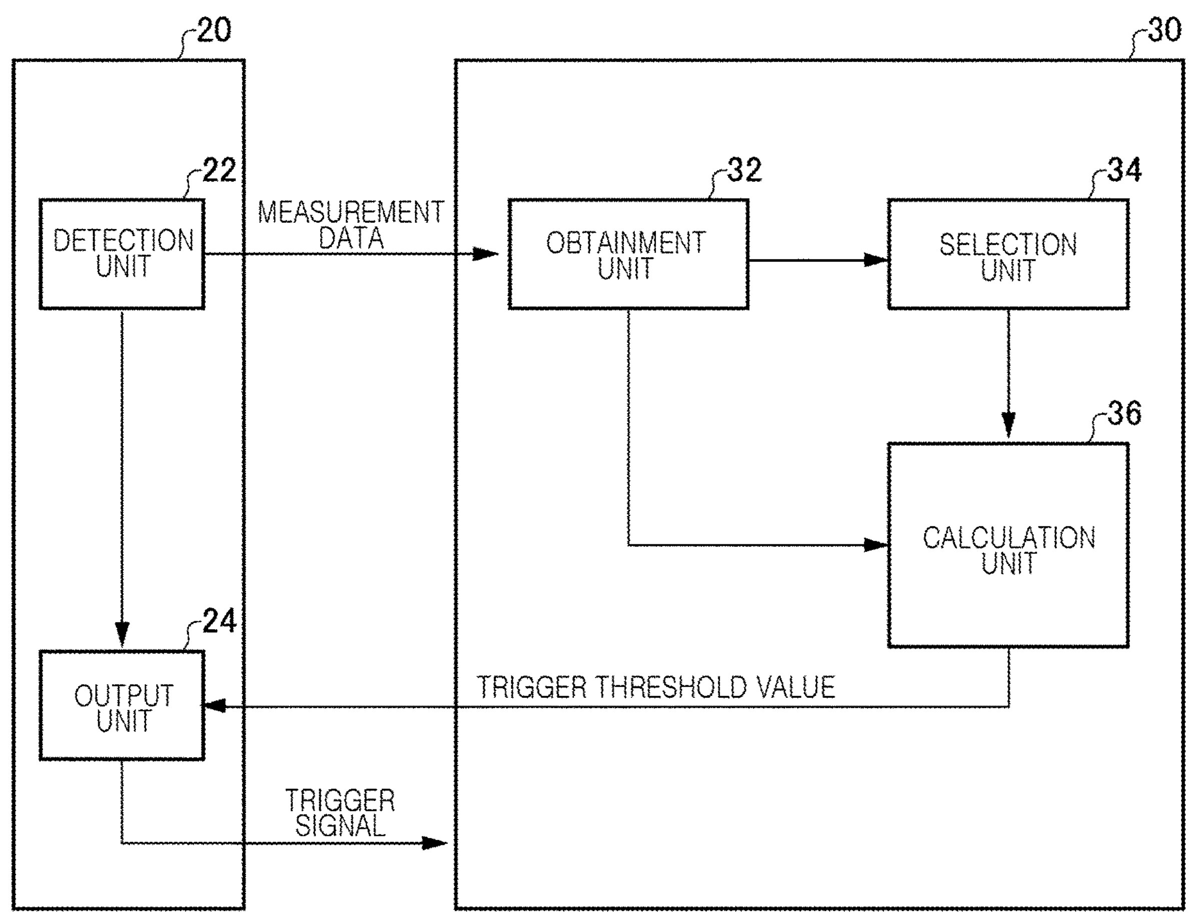
FIG. 1B shows a more specific configuration of a magnetic sensor 20 and a processing unit 30.

FIG. 1B shows a more specific configuration of the magnetic sensor 20 and the processing unit 30. The magnetic sensor 20 in this example is provided with a detection unit 22 and an output unit 24. The processing unit 30 is provided with an obtainment unit 32, a selection unit 34, and a calculation unit 36.

The detection unit 22 detects a magnetic field generated by the magnetic-field generation unit 10. The detection unit 22 outputs the measurement data (Bx, By, Bz) on the detected magnetic field to the detection unit 22 or the processing unit 30. Bx, By, and Bz respectively indicate magnetic flux densities in the X-axis direction, the Y-axis direction, and the Z-axis direction. The detection unit 22 detects the magnetic flux densities in the three axis directions as the measurement data in this example, but it may detect magnetic flux densities in two axis directions.

The obtainment unit 32 obtains the measurement data (Bx, By, Bz) from the magnetic sensor 20. For example, the obtainment unit 32 obtains the measurement data for a case where the magnetic-field generation unit 10 is located at a predetermined reference position P0. The reference position P0 may be any position at which the magnetic sensor 20 can detect a position of the magnetic-field generation unit 10.

Moreover, the obtainment unit 32 may obtain information required for selection of a detection axis or calculation of a trigger threshold value, such as an event occurrence position Pe of the magnetic-field generation unit 10. A method of obtaining the event occurrence position Pe will be described later. The obtainment unit 32 outputs the obtained event occurrence position Pe to the selection unit 34 and the calculation unit 36. The obtainment unit 32 may obtain the information such as the event occurrence position Pe from a storage unit provided in the processing unit 30.

Moreover, the obtainment unit 32 may obtain, for each detection axis, a detectable region and an undetectable region according to the position of the magnetic-field generation unit 10. The detectable region is a region where the trigger threshold value can be detected on a corresponding detection axis. The undetectable region is a region where the trigger threshold value cannot be detected on a corresponding detection axis. A case where the trigger threshold value cannot be detected is, for example, a case where the position of the magnetic-field generation unit 10 cannot be identified from the outputted magnetic flux density. The plurality of detection axes may be selected so as to each have a detectable region and an undetectable region in a different region.

The selection unit 34 selects a detection axis for event detection based on the event occurrence position Pe. For example, the selection unit 34 selects, as the detection axis, a first axis parallel to a predetermined first direction in which the magnetic-field generation unit 10 moves, or a second axis orthogonal to the first axis. The selection unit 34 selects the detection axis such that the position of the magnetic-field generation unit 10 corresponds to the detectable region. A specific method of selecting the detection axis will be described later.

The calculation unit 36 calculates the trigger threshold value according to the event occurrence position Pe on the detection axis. The trigger threshold value is a magnetic flux density detected, on the selected detection axis, by the magnetic sensor 20 at the event occurrence position Pe. The calculation unit 36 outputs the calculated trigger threshold value to the output unit 24.

The output unit 24 detects a predetermined trigger threshold value to output the trigger signal. The output unit 24 in this example generates the trigger signal when the magnetic flux density of the magnetic field detected by the detection unit 22 exceeds or falls below the trigger threshold value. The output unit 24 outputs the generated trigger signal to the processing unit 30. The processing unit 30 may execute a predetermined processing in response to reception of the trigger signal.

Figure 2A:
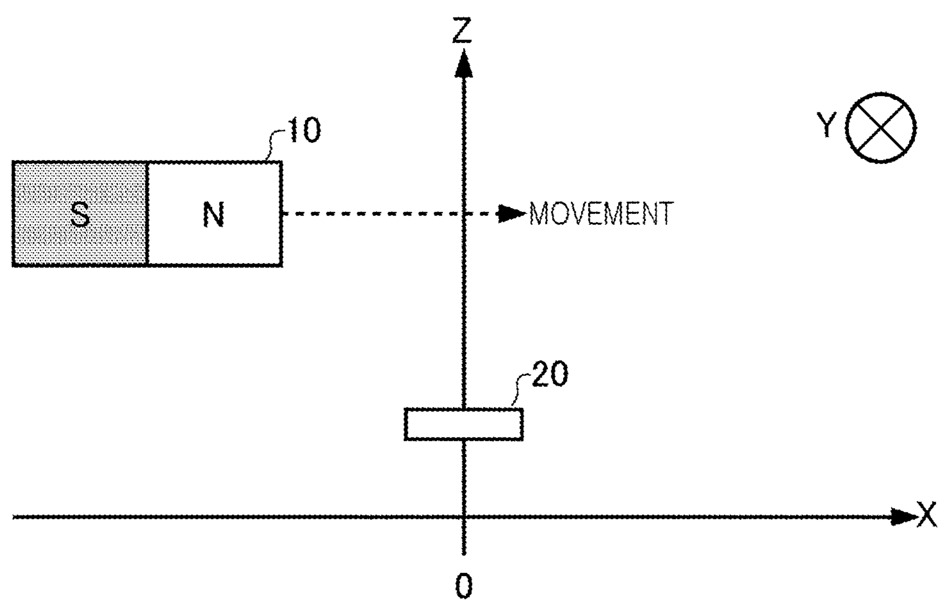
FIG. 2A shows an example of an arrangement method of a magnetic-field generation unit 10 and the magnetic sensor 20.

FIG. 2A shows an example of an arrangement method of the magnetic-field generation unit 10 and the magnetic sensor 20. This figure shows the magnetic-field generation unit 10 and the magnetic sensor 20 viewed from the Y-axis direction.

The magnetic-field generation unit 10 in this example has a north pole and a south pole arrayed in the X-axis direction. The X-axis direction is an example of a first direction. However, the magnetic-field generation unit 10 may move not only in the X-axis direction but also in the Y-axis direction, the Z-axis direction, or other directions. The magnetic-field generation unit 10 in this example has the south pole on the negative X-axis direction side with respect to the north pole, but the present invention is not limited thereto. Distance between the magnetic-field generation unit 10 and the magnetic sensor 20 in the Z-axis direction is not particularly limited as long as the distance allows the magnetic sensor 20 to detect the magnetic field of the magnetic-field generation unit 10.

The magnet of the magnetic-field generation unit 10 has a cuboid shape in this example, but it may have another shape such as a cylindrical shape. The magnet may be made of any material such as neodymium or ferrite. In an example, when the event detection system 100 is equipped on a rollable phone, the magnetic-field generation unit 10 is equipped on a display side, the magnetic sensor 20 is equipped on a housing side, and relative positional relationship between the magnetic-field generation unit 10 and the magnetic sensor 20 changes in response to expansion and contraction of the display.

It should be noted that, if the relative positional relationship between the magnetic-field generation unit 10 and the magnetic sensor 20 changes, the magnetic sensor 20 may move, or both the magnetic-field generation unit 10 and the magnetic sensor 20 may move. In an example, when the event detection system 100 is equipped on a rollable phone, the magnetic-field generation unit 10 is equipped on a display side, the magnetic sensor 20 is equipped on a housing side, and the relative positional relationship between the magnetic-field generation unit 10 and the magnetic sensor 20 changes in response to expansion and contraction of the display.

Figure 2B:
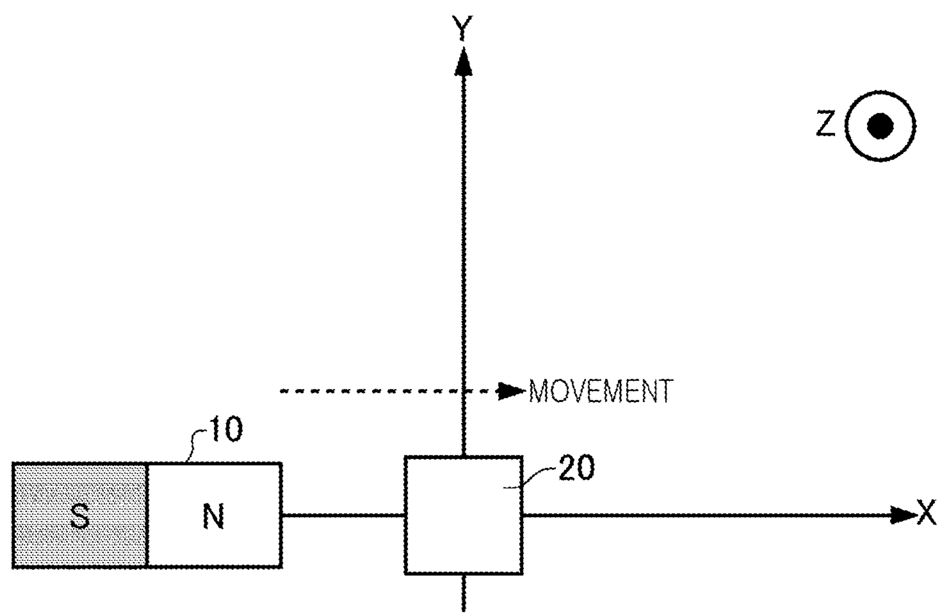
FIG. 2B shows an example of an arrangement method of the magnetic-field generation unit 10 and the magnetic sensor 20.

FIG. 2B shows an example of an arrangement method of the magnetic-field generation unit 10 and the magnetic sensor 20. This figure shows the magnetic-field generation unit 10 and the magnetic sensor 20 viewed from the Z-axis direction. That is, a point of view in this example indicates a point of view corresponding to a position rotated by 90 degrees from that in FIG. 2A.

The magnetic-field generation unit 10 is moving in the XY plane so as to cross the magnetic sensor 20. The fact that the magnetic-field generation unit 10 crosses the magnetic sensor 20 means that the magnetic-field generation unit 10 and a part of the magnetic sensor 20 overlap with each other in the XY plane. In other words, the magnetic-field generation unit 10 may move so as to pass over the magnetic sensor 20. Moreover, the magnetic-field generation unit 10 may move in a YZ plane so as to cross the magnetic sensor 20. The magnetic-field generation unit 10 crosses the magnetic sensor 20 in a predetermined plane, thereby facilitating detection of change in a magnetic flux density in response to the movement of the magnetic-field generation unit 10, and facilitating determination of a trigger threshold value.

Moreover, the magnetic-field generation unit 10 moves parallel to the X-axis direction in this example, but it may move diagonally with respect to the X axis in the XY plane. In this way, a degree of freedom in housing design can be increased without limitation to a case where the magnetic-field generation unit 10 is arranged in the XY plane so as to cross the magnetic sensor 20.

In this example, a case is shown where the magnetic-field generation unit 10 moves on a straight line, but the present invention is not limited thereto. That is, the magnetic-field generation unit 10 may move on a curve or may move drawing any other trajectory. The magnetic-field generation unit 10 may rotate on a predetermined circumference.

Figure 2C:
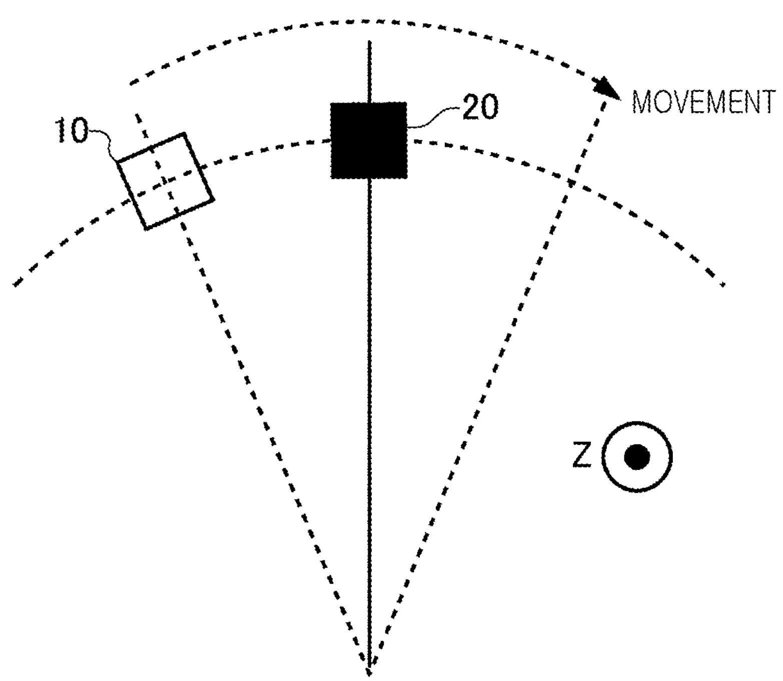
FIG. 2C shows an example of an arrangement method of the magnetic-field generation unit 10 and the magnetic sensor 20.

FIG. 2C shows an example of an arrangement method of the magnetic-field generation unit 10 and the magnetic sensor 20. This figure shows the magnetic-field generation unit 10 and the magnetic sensor 20 viewed from the Z-axis direction. This figure is a top view showing a case where the magnetic-field generation unit 10 moves on a circumference. In FIG. 2C, the magnetic-field generation unit 10 is moving in the XY plane so as to cross the magnetic sensor 20. The fact that the magnetic-field generation unit 10 crosses the magnetic sensor 20 means that the magnetic-field generation unit 10 and a part of the magnetic sensor 20 overlap with each other in the XY plane. In other words, the magnetic-field generation unit 10 may move so as to pass over the magnetic sensor 20. Moreover, the magnetic-field generation unit 10 may not pass over the magnetic sensor 20.

For example, the magnetic-field generation unit 10 may move in response to folding of a foldable smartphone (a foldable phone, for example), or the magnetic-field generation unit 10 may move in response to rotation of a bezel of a smartwatch. For a foldable phone, the magnetic-field generation unit 10 may be provided on one surface while the magnetic sensor 20 may be provided on the other surface, and the magnetic-field generation unit 10 may move on a curve in response to opening and closing of the foldable phone. For a smartwatch, the magnetic sensor 20 is provided on a main body side while the magnetic-field generation unit 10 is provided on a bezel side, and the magnetic-field generation unit 10 may rotate on the circumference in response to rotational drive of the bezel.

Figure 3A:
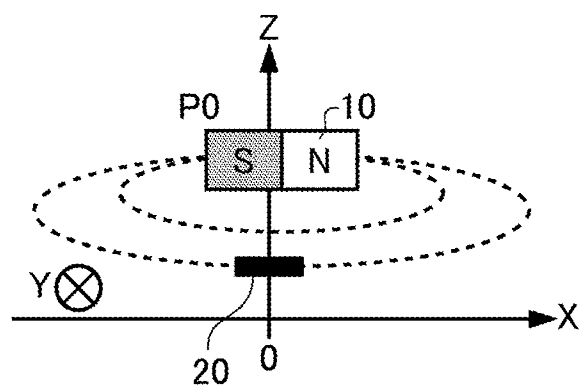
FIG. 3A shows a state where the magnetic-field generation unit 10 is arranged at a reference position P0.

FIG. 3A shows a state where the magnetic-field generation unit 10 is arranged at a reference position P0. The magnetic-field generation unit 10 in this example is arranged such that a boundary between a north pole and a south pole is located above the magnetic sensor 20. In this example, a magnetic flux density Bx in the X-axis direction is larger than a magnetic flux density Bz in the Z-axis direction. However, a magnetic flux density detected by the magnetic sensor 20 at the reference position P0 is not limited thereto.

Figure 3B:
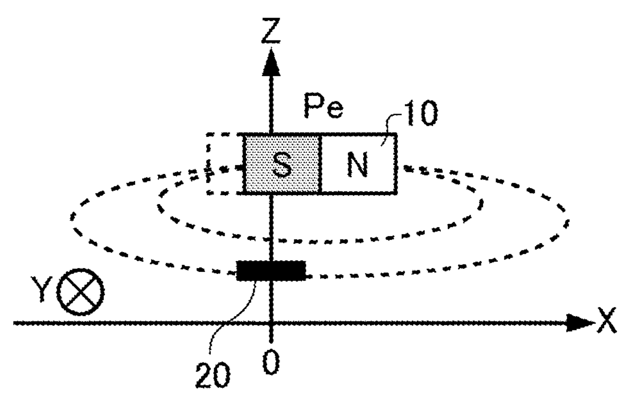
FIG. 3B shows a state where the magnetic-field generation unit 10 is arranged at an event occurrence position Pe.

FIG. 3B shows a state where the magnetic-field generation unit 10 is arranged at an event occurrence position Pe. That is, the event detection system 100 executes a predetermined processing when the magnetic-field generation unit 10 is arranged at the position in this figure. The magnetic-field generation unit 10 in this example is moving to the positive X-axis direction side with respect to the reference position P0 in FIG. 3A. In this case, a component of a magnetic flux density Bz in the Z-axis direction is larger than that for a case where the magnetic-field generation unit 10 is at the reference position P0 in FIG. 3A. Relative positional relationship between the magnetic-field generation unit 10 and the magnetic sensor 20 as well as a moving direction of the magnetic-field generation unit 10 are not limited to this example as long as they allow the magnetic sensor 20 to detect a trigger threshold value.

Figure 3C:
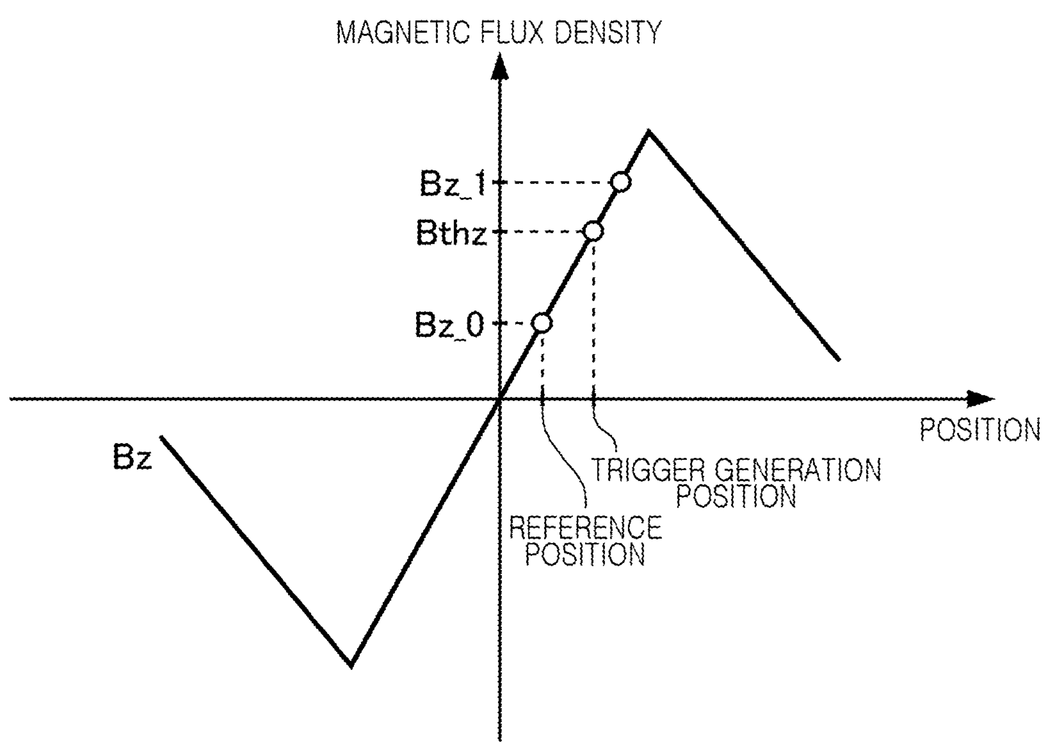
FIG. 3C shows a magnetic field waveform according to a position of the magnetic-field generation unit 10.

FIG. 3C shows a magnetic field waveform according to a position of the magnetic-field generation unit 10. The horizontal axis indicates a position of the magnetic-field generation unit 10 in the X-axis direction, while the vertical axis indicates a magnetic flux density Bz in the Z-axis direction. Magnitude of the magnetic flux density Bz measured by the magnetic sensor 20 changes in response to movement of the magnetic-field generation unit 10. A magnetic flux density Bz_0 is a magnetic flux density detected by the magnetic sensor 20 with the magnetic-field generation unit 10 being arranged at the reference position P0. A magnetic flux density Bz_1 is a magnetic flux density detected by the magnetic sensor 20 with the magnetic-field generation unit 10 being arranged on the positive X-axis direction side with respect to the reference position P0.

A magnetic flux density Bthz is a magnetic flux density detected by the magnetic sensor 20 with the magnetic-field generation unit 10 being arranged at the event occurrence position Pe. The event detection system 100 in this example generates a trigger signal when a magnetic flux density detected by the magnetic sensor 20 exceeds the magnetic flux density Bthz. It should be noted that, although this example has described for illustrative purposes a case where one detection axis is used, two or more detection axes may be used to detect an event.

Figure 3D:
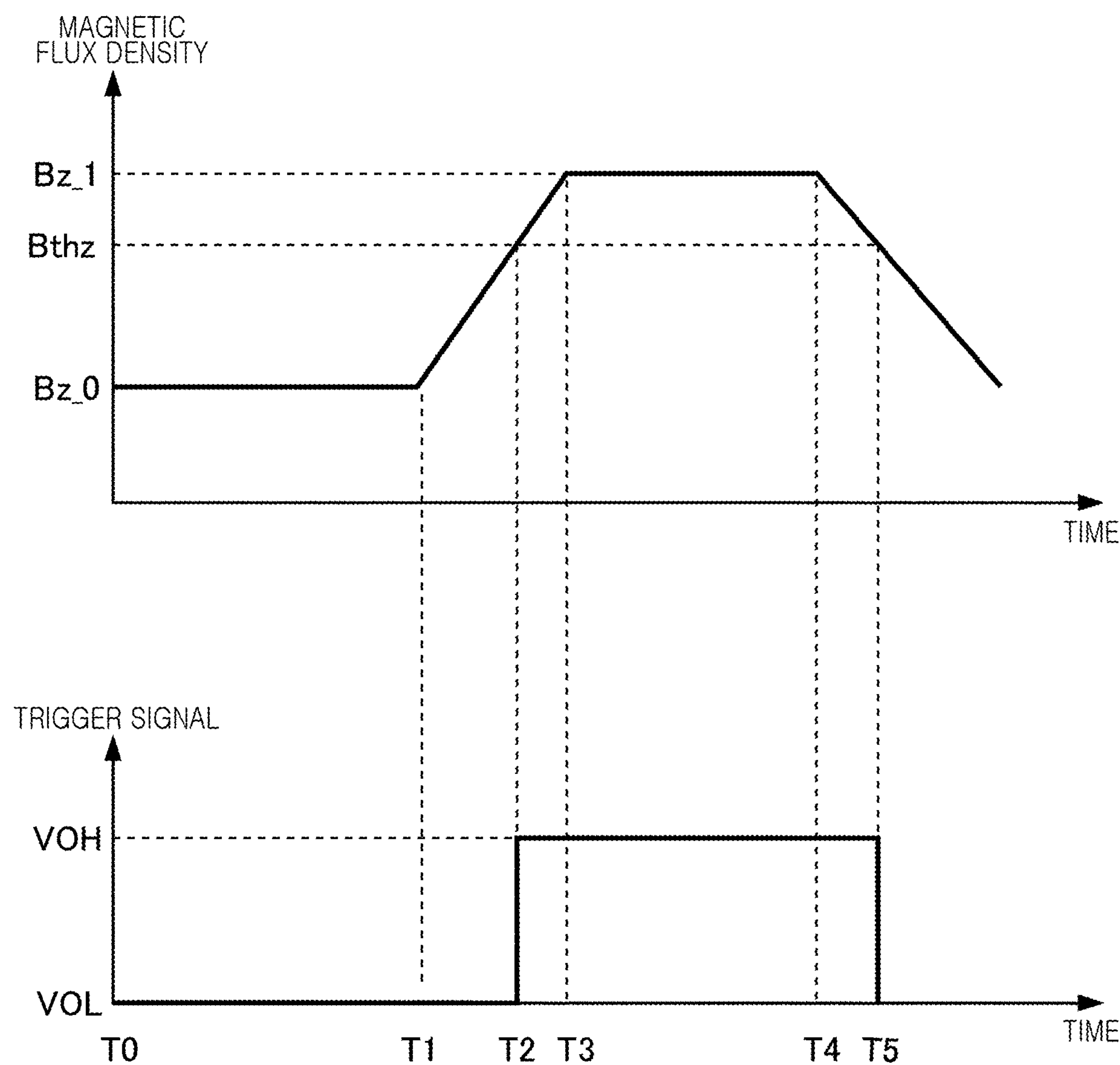
FIG. 3D shows changes in a magnetic flux density and a trigger signal corresponding to the magnetic field waveform in FIG. 3C.

FIG. 3D shows changes in a magnetic flux density and a trigger signal corresponding to the magnetic field waveform in FIG. 3C. In this example, from a time T0 to a time T1, the magnetic-field generation unit 10 is stopped at the reference position P0, and the magnetic flux density Bz does not fluctuate.

At the time T1, the magnetic-field generation unit 10 starts moving from the reference position P0, and the magnetic flux density gradually increases from Bz_0. At a time T2, when the magnetic flux density exceeds Bthz, the trigger signal is generated by the magnetic sensor 20. Subsequently, at a time T3, the magnetic-field generation unit 10 moves to a position according to the magnetic flux density Bz_1 and is stopped. At a time T4, the magnetic-field generation unit 10 starts moving to the reference position P0. At a time T5, when the magnetic flux density falls below Bthz, the generation of the trigger signal is stopped. In this way, the event detection system 100 in this example generates the trigger signal based on threshold value determination inside the magnetic sensor 20.

An example of a threshold value determination method using a biaxial magnetic field will be described below.

Figure 4A:
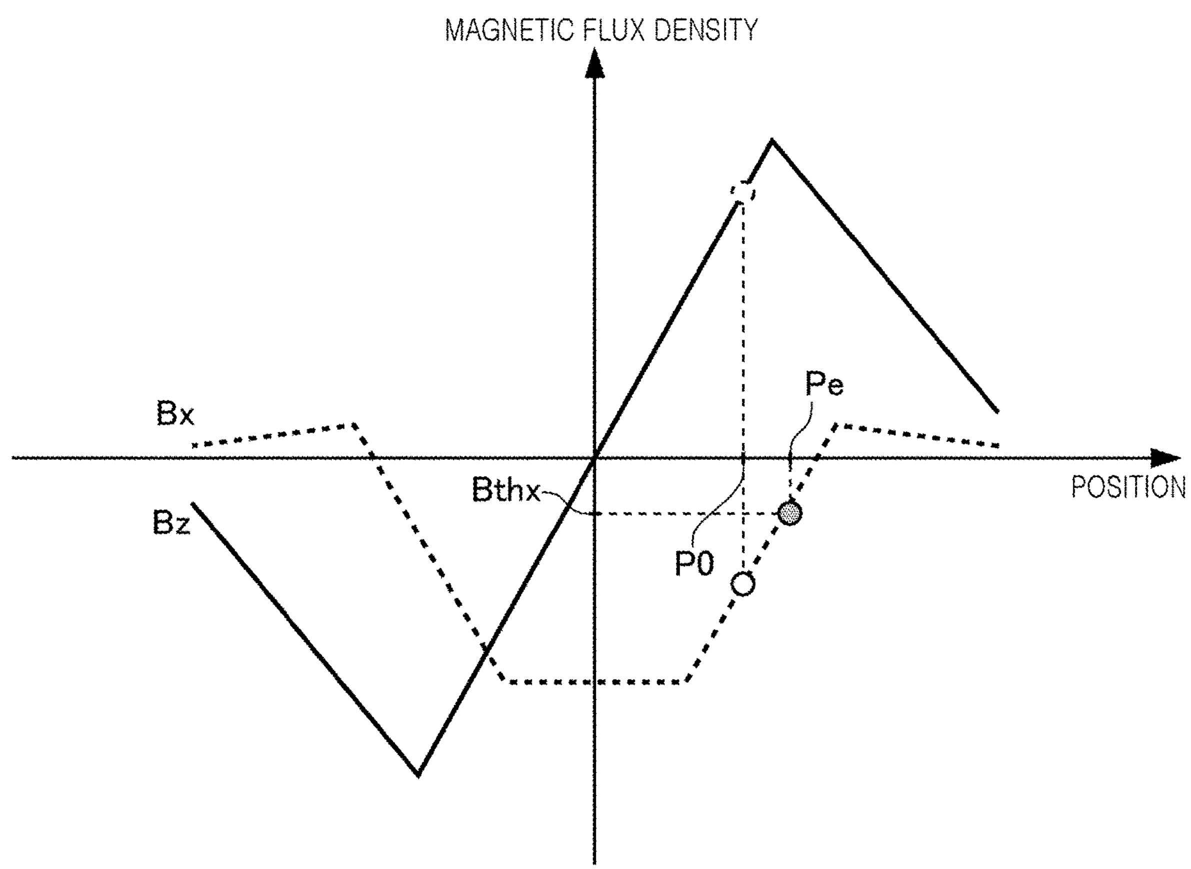
FIG. 4A shows an example of a threshold value determination method using a biaxial magnetic field.

FIG. 4A shows an example of a threshold value determination method using the biaxial magnetic field. In this example, as shown in FIG. 2A and FIG. 2B, the magnetic-field generation unit 10 is moving in the XY plane so as to cross the magnetic sensor 20. The event detection system 100 in this example selectively uses a magnetic flux density Bx in the X-axis direction and a magnetic flux density Bz in the Z-axis direction. However, an event occurrence position Pe corresponds to a vicinity of an inflection point of the magnetic flux density Bz in the Z-axis direction, and with the Z axis being used as a detection axis, the event occurrence position Pe cannot be accurately detected. As such, the event detection system 100 in this example detects the event occurrence position Pe by using the magnetic flux density Bx that is linearly changing at the event occurrence position Pe. The event detection system 100 in this example can extend an event detectable region by performing the threshold value determination using measurement data obtained by detecting a magnetic flux density of the magnetic field of two or more axes.

In this embodiment, an event can be detected even when the magnetic-field generation unit 10 moves in the XY plane so as not to cross the magnetic sensor 20.

Figure 4B:
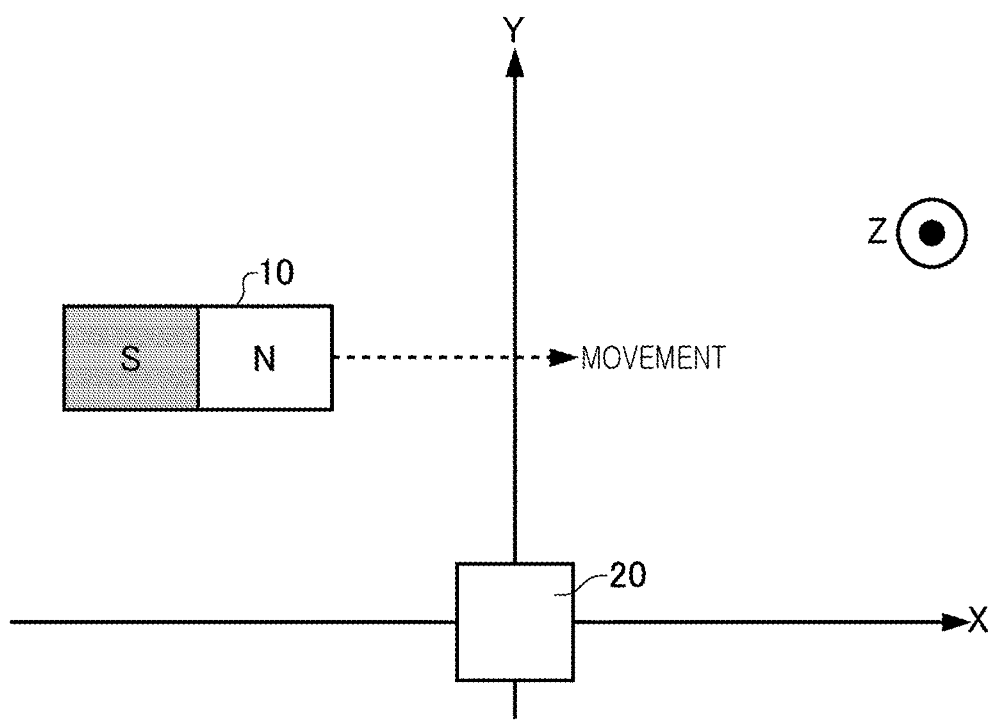
FIG. 4B shows an example of an arrangement method of the magnetic-field generation unit 10 and the magnetic sensor 20.

FIG. 4B shows an example of an arrangement method of the magnetic-field generation unit 10 and the magnetic sensor 20. This figure shows the magnetic-field generation unit 10 and the magnetic sensor 20 viewed from the Z-axis direction. The magnetic-field generation unit 10 in this example is moving in the XY plane at a position deviated from the magnetic sensor 20 in the Y-axis direction, without crossing the magnetic sensor 20. In FIG. 4B, an amount of movement y in the Y-axis direction is a positive value. That is, the magnetic-field generation unit 10 is moving in the positive direction of the Y-axis direction by y, but the present invention is not limited thereto.

Figure 4C:
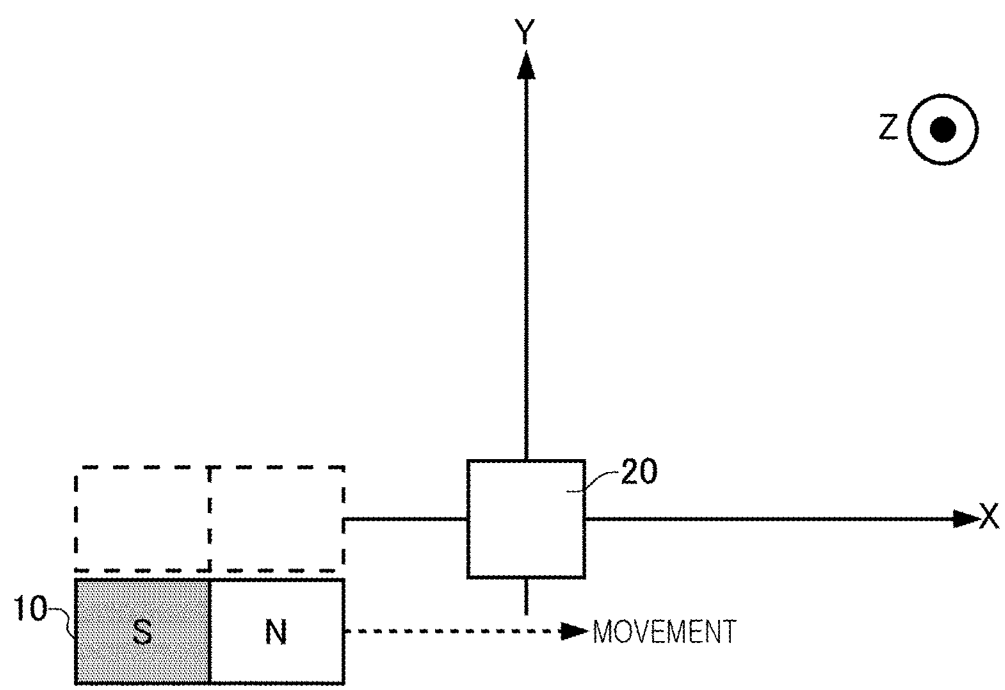
FIG. 4C shows an example of an arrangement method of the magnetic-field generation unit 10 and the magnetic sensor 20.

FIG. 4C shows an example of an arrangement method of the magnetic-field generation unit 10 and the magnetic sensor 20. This figure shows the magnetic-field generation unit 10 and the magnetic sensor 20 viewed from the Z-axis direction. The magnetic-field generation unit 10 in this example is moving in the XY plane at a position deviated from the magnetic sensor 20 in the Y-axis direction, without crossing the magnetic sensor 20. The magnetic-field generation unit 10 may move in the positive direction of the X-axis direction in the XZ plane, and an amount of movement y in the Y-axis direction is a negative value. That is, the magnetic-field generation unit 10 may be moving in the negative direction of the Y axis by y in the XY plane.

Figure 4D:
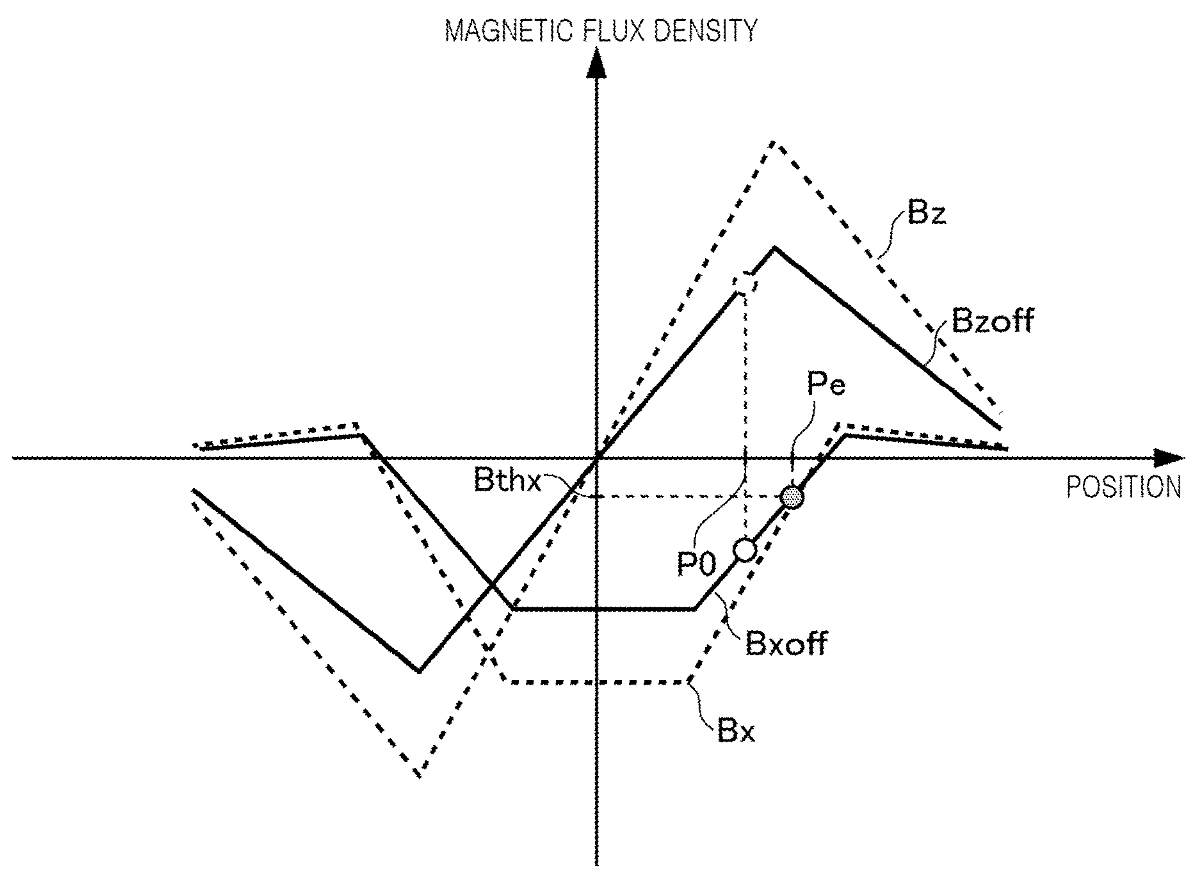
FIG. 4D shows an example of a threshold value determination method using the biaxial magnetic field.

FIG. 4D shows magnetic field waveforms according to a position of the magnetic-field generation unit 10. The horizontal axis indicates a position of the magnetic-field generation unit 10 in the X-axis direction, while the vertical axis indicates a magnetic flux density Bx in the X-axis direction and a magnetic flux density Bz in the Z-axis direction. Magnitudes of the magnetic flux densities Bx and Bz measured by the magnetic sensor 20 change in response to movement of the magnetic-field generation unit 10.

The magnetic field waveforms (Bx, Bz) for a case where the magnetic-field generation unit 10 moves so as to cross the magnetic sensor 20 as shown in FIG. 2B are indicated by dashed lines, while the magnetic field waveforms (Bxoff, Bzoff) for a case where the magnetic-field generation unit 10 moves at a position deviated from the magnetic sensor 20 in the Y-axis direction as shown in FIG. 4C are indicated by solid lines. In a case like FIG. 4C, distance between the magnetic-field generation unit 10 and the magnetic sensor 20 is larger than that for a case of FIG. 2B, so that a magnetic flux density detected by the magnetic sensor 20 decreases.

However, as shown in FIG. 4D, a position in the X-axis direction of the magnetic-field generation unit 10 that gives a peak of the magnetic flux density does not change significantly between a case where the magnetic-field generation unit 10 crosses the magnetic sensor 20 in the XY plane and a case where the magnetic-field generation unit 10 moves in the XY plane at the position deviated from the magnetic sensor 20 in the Y-axis direction. Therefore, even when the magnetic-field generation unit 10 does not cross the magnetic sensor 20 in the XY plane, an event detection method can be applied which is similar to that for a case where the magnetic-field generation unit 10 crosses the magnetic sensor 20.

Here, the larger an amount of movement y of the magnetic-field generation unit 10 in the Y-axis direction is, the smaller intensity of the magnetic flux density detected by the magnetic sensor 20 is. Although not shown, intensity of the magnetic flux density detected by the magnetic sensor 20 in a case of FIG. 4B is smaller than intensity of the magnetic flux density detected by the magnetic sensor 20 in a case of FIG. 4C.

Accordingly, the amount of movement y of the magnetic-field generation unit 10 can be determined in consideration of a magnetic flux density size for a case where an event can be detected from a magnetic flux density at a position of the magnetic sensor 20, including an influence of external magnetic field noise or the like. In this way, a degree of freedom in arrangement of the magnetic-field generation unit 10 and the magnetic sensor 20 is increased, so that a degree of freedom in housing design can be increased.

Figure 5:
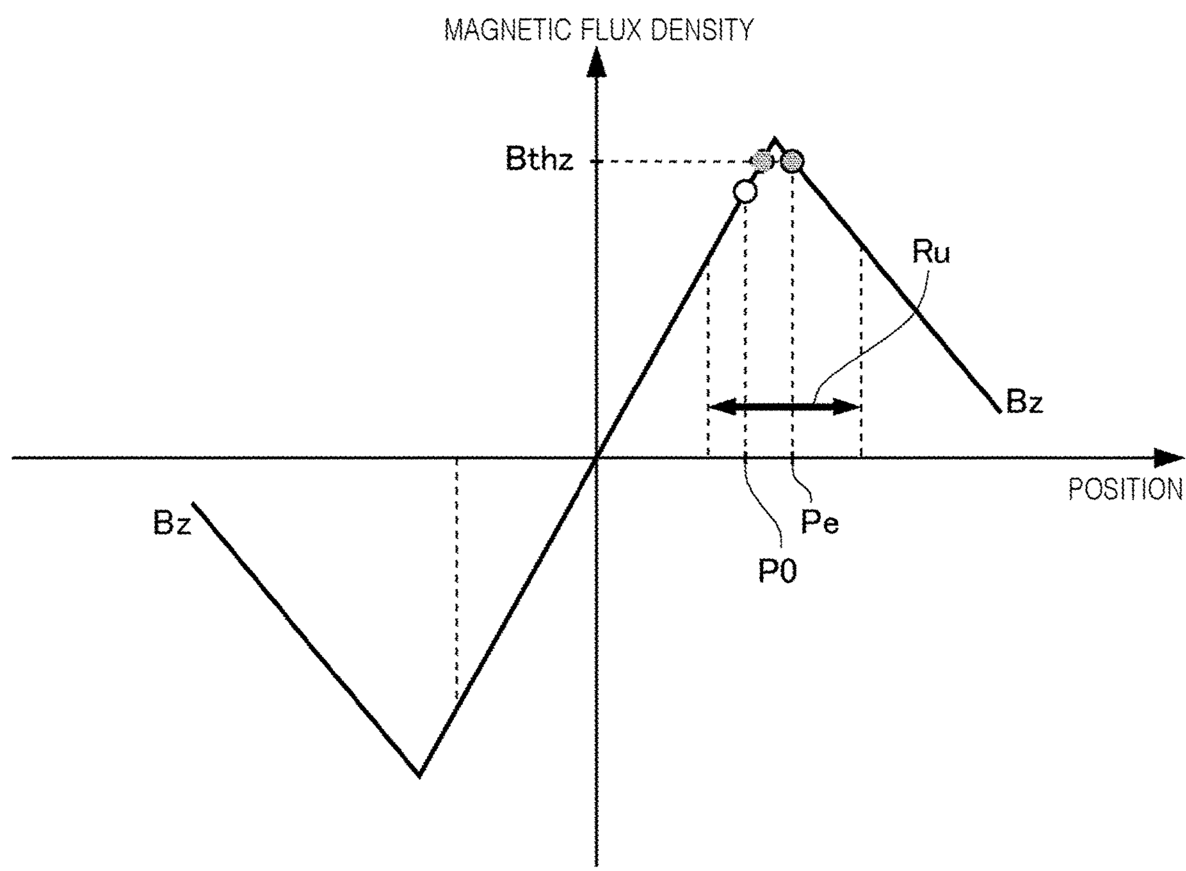
FIG. 5 shows a comparative example of a threshold value determination method using a uniaxial magnetic field.

FIG. 5 shows a comparative example of a threshold value determination method using a uniaxial magnetic field. In this example, an event occurrence position Pe corresponds to a vicinity of an inflection point of a magnetic flux density Bz in the Z-axis direction, so that a position of the magnetic-field generation unit is hardly determined accurately in a vicinity of the event occurrence position Pe. As such, with the threshold value determination method in the comparative example, an undetectable region Ru is generated where an event cannot be detected. As such, with the method in the comparative example, the event occurrence position Pe that can be detected is limited.

Figure 6:
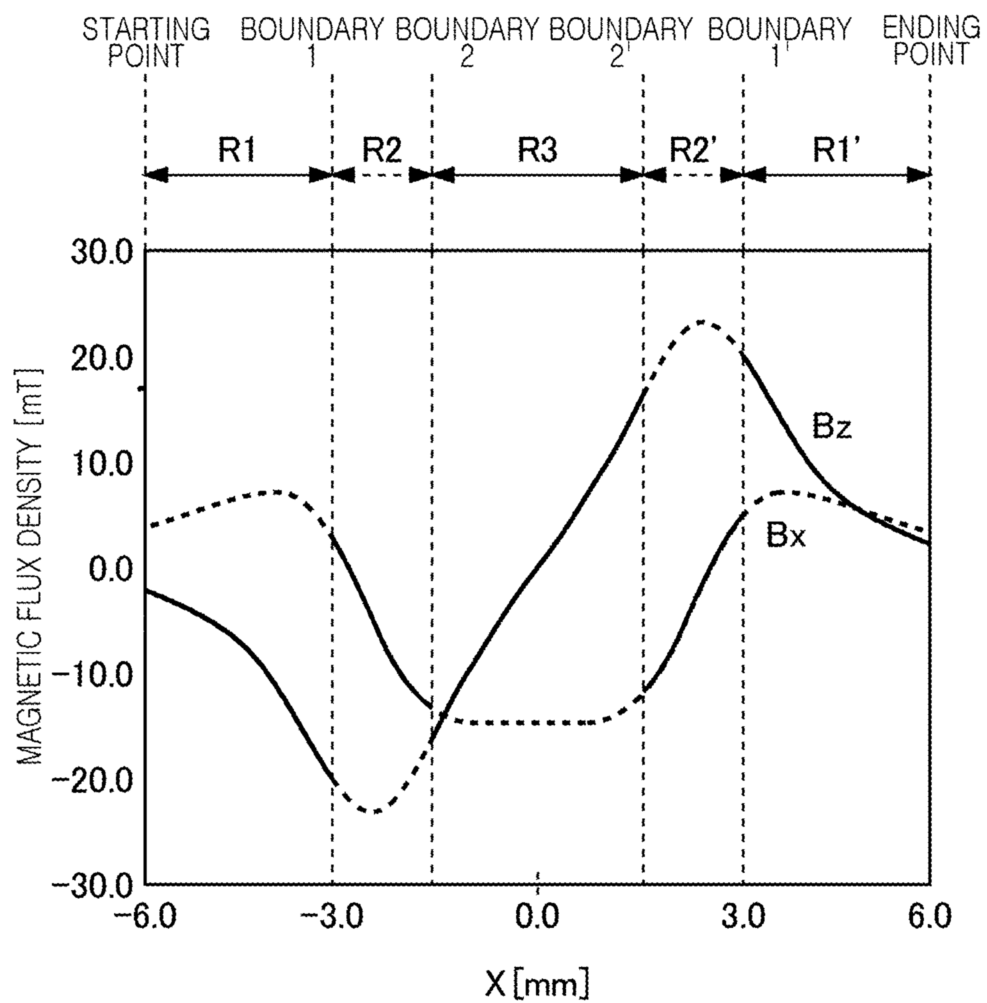
FIG. 6 shows an example of a more specific threshold value determination method.

FIG. 6 shows an example of a more specific threshold value determination method. The event detection system 100 in this example selects and uses any detection axis according to a position in the X-axis direction. A solid line in the graph indicates a detectable region where a position of the magnetic-field generation unit 10 can be detected. A dashed line in the graph indicates an undetectable region where the position of the magnetic-field generation unit 10 cannot be detected. In an example, the detectable region is a region that does not have an inflection point of a magnetic flux density and where the magnetic flux density monotonically increases or monotonically decreases in response to movement of the magnetic-field generation unit 10. The undetectable region is a region where a waveform of the magnetic flux density has an inflection point or a region where change in the magnetic flux density in response to the movement of the magnetic-field generation unit 10 is small.

The selection unit 34 selects the X axis when the event occurrence position Pe belongs to a detectable region where the position of the magnetic-field generation unit 10 can be detected on the X axis. On the other hand, the selection unit 34 selects the Z axis when the event occurrence position Pe does not belong to the detectable region of the X axis but belongs to a detectable region of the Z axis. Moreover, the selection unit 34 may select the detection axis based on the reference position P0 and the event occurrence position Pe.

The event detection system 100 in this example selects an axis separately in five regions of a region R1, a region R2, a region R3, a region R1', and a region R2'. The selection unit 34 selects the Z axis as the detection axis in the region R1, the region R3, and the region R1'. The selection unit 34 selects the X axis as the detection axis in the region R2 and the region R2'.

The region R1 is a zone between a starting point and a boundary 1, where a trigger threshold value can be determined by using a magnetic flux density Bz that decreases monotonically. The region R2 is a zone between the boundary 1 and a boundary 2, where the trigger threshold value can be determined by using a magnetic flux density Bx that decreases monotonically. The region R3 is a zone between the boundary 2 and a boundary 2', where the trigger threshold value can be determined by using the magnetic flux density Bz that increases monotonically. The region R2' is a zone between the boundary 2' and a boundary 1', where the trigger threshold value is determined by using the magnetic flux density Bx that increases monotonically. The region RF is a zone between the boundary 1' and an ending point, where the trigger threshold value is determined by using the magnetic flux density Bz that decrease monotonically. A method of setting the regions is not limited thereto.

As described above, the event detection system 100 sets each of the regions such that the magnetic flux density of the selected axis does not have an inflection point, and selects the detection axis. This allows the event detection system 100 to, in a wider range, determine the trigger threshold value to generate a trigger signal.

In this embodiment, when a plurality of trigger threshold values can be set for each detection axis, event detection can be performed for when the magnetic-field generation unit 10 has moved in the plus direction or the minus direction of the X axis. Moreover, in this embodiment, an event can be detected even when only one trigger threshold value can be set for each detection axis.

As an example, a method of detecting an event will be shown for when the magnetic-field generation unit 10 moves from the reference position P0. A method of detecting an event will be described below for when the magnetic-field generation unit 10 has moved in the plus direction or the minus direction of the X axis, but a moving direction of the magnetic-field generation unit 10 is not limited thereto.

Figure 7A:
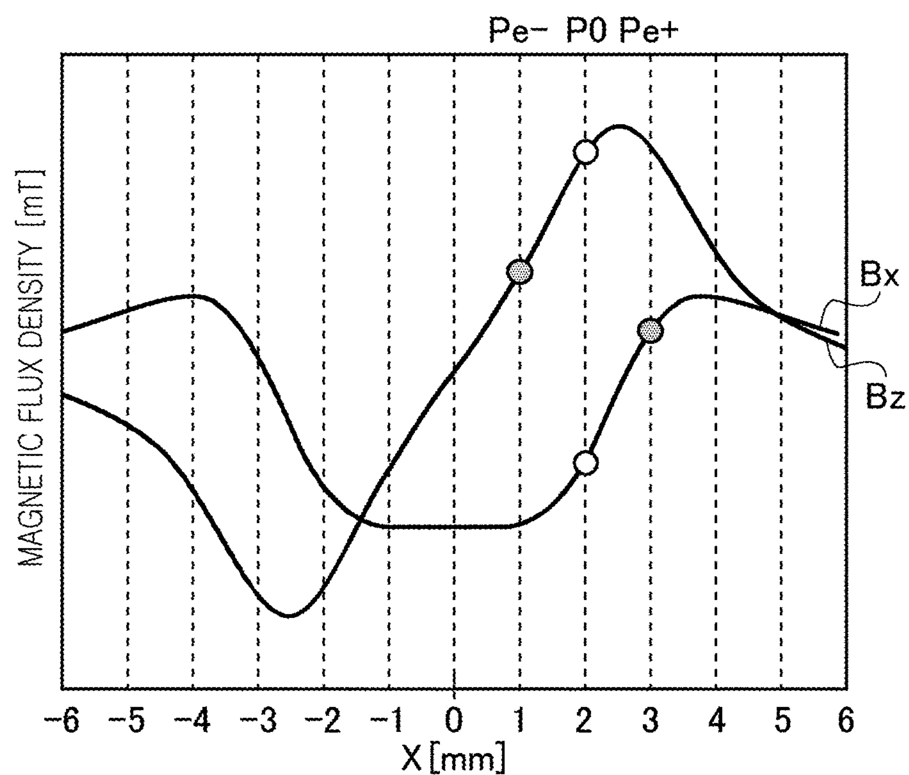
FIG. 7A shows an example of a more specific threshold value determination method.

FIG. 7A shows magnetic field waveforms according to a position of the magnetic-field generation unit 10. The horizontal axis indicates a position of the magnetic-field generation unit 10 in the X-axis direction, while the vertical axis indicates a magnetic flux density Bx in the X-axis direction and a magnetic flux density Bz in the Z-axis direction. When the magnetic-field generation unit 10 has moved in the plus direction or the minus direction of the X axis near the reference position P0, if neither Bx nor Bz includes an inflection point, event detections can be performed for when the magnetic-field generation unit 10 has moved ±1 mm from the reference position P0.

For example, when the reference position P0 is 2 mm in FIG. 7A, the event detections are respectively performed by using Bx for a trigger threshold value according to an event occurrence position Pe+ for a case where the magnetic-field generation unit 10 has moved to the plus side and by using Bz for a trigger threshold value according to an event occurrence position Pe− for a case where the magnetic-field generation unit 10 has moved to the minus side, so that an event can be detected even when only one trigger threshold value can be set for each detection axis However, for example, when the reference position P0 is 0 mm in FIG. 7A, an event cannot be detected by using Bx because change in Bx is small at a periphery of the reference position P0. Even in such a case, an event can be detected as long as the magnetic sensor 20 can calculate a square-root of sum of squares Bsum of a magnetic flux density. That is, an event can be detected by using the square-root of sum of squares Bsum to calculate a trigger threshold value according to an event occurrence position Pe. The square-root of sum of squares Bsum of the magnetic flux density can be expressed by a formula shown in the following Equation 1.

$$B_{sum}=\sqrt{B_x^2+B_y^2+B_z^2} \quad \text{(Equation 1)}$$

Figure 7B:
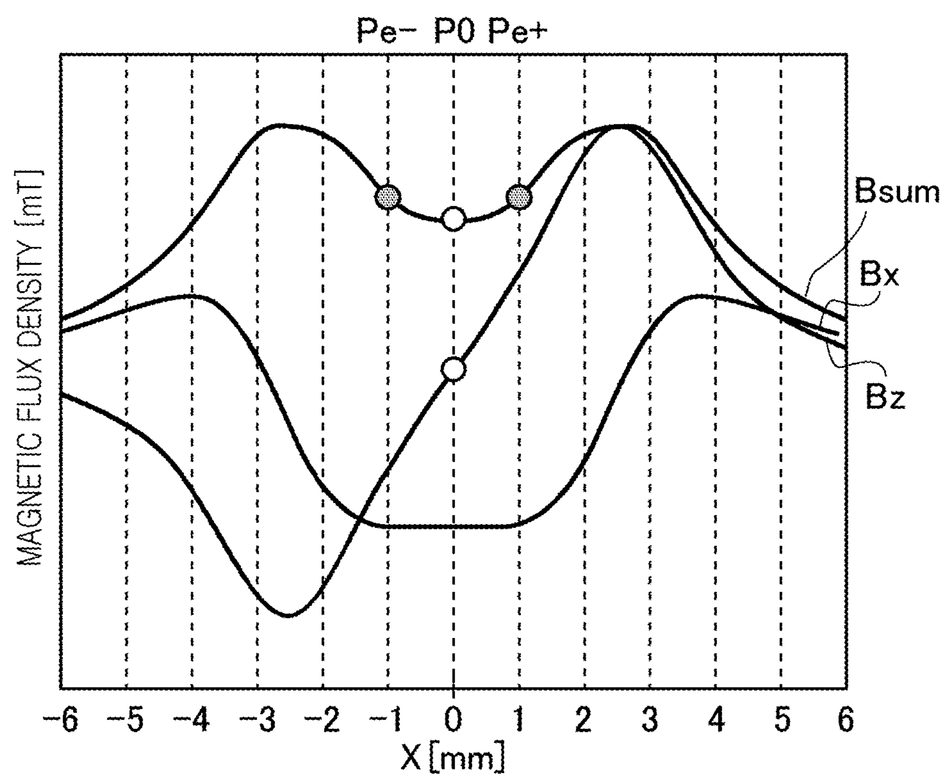
FIG. 7B shows an example of a more specific threshold value determination method.

FIG. 7B shows magnetic field waveforms according to a position of the magnetic-field generation unit 10. The horizontal axis indicates a position of the magnetic-field generation unit 10 in the X-axis direction, while the vertical axis indicates a magnetic flux density Bx in the X-axis direction, a magnetic flux density Bz in the Z-axis direction, and a square-root of sum of squares Bsum of a magnetic flux density. For example, when a reference position P0 is 0 mm, event detections can be performed for when the magnetic-field generation unit 10 has moved ±1 mm from the reference position P0, by using Bsum having a symmetrical shape.

Figure 7C:
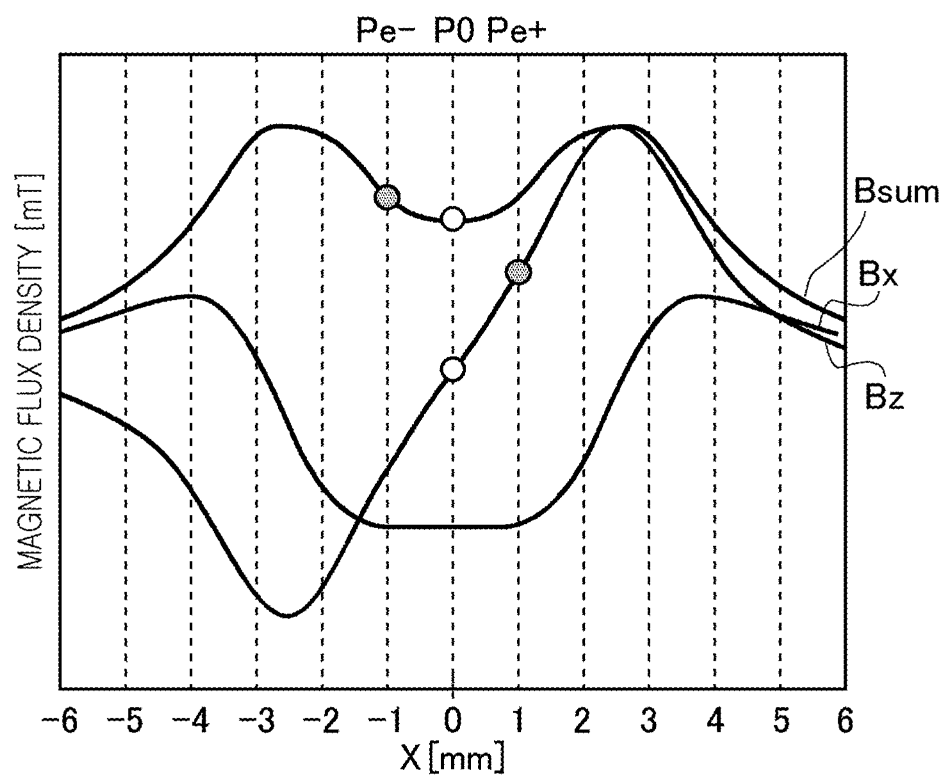
FIG. 7C shows an example of a more specific threshold value determination method.

FIG. 7C shows magnetic field waveforms according to a position of the magnetic-field generation unit 10. In FIG. 7C, a reference position P0 is 0 mm as in FIG. 7B. In FIG. 7C, event detections are respectively performed by using Bz for a trigger threshold value according to an event occurrence position Pe+ for a case where the magnetic-field generation unit 10 has moved to the plus side and by using Bsum for a trigger threshold value according to an event occurrence position Pe− for a case where the magnetic-field generation unit 10 has moved to the minus side. As a result, an event can be detected even when only one trigger threshold value can be set for each detection axis.

Figure 7D:
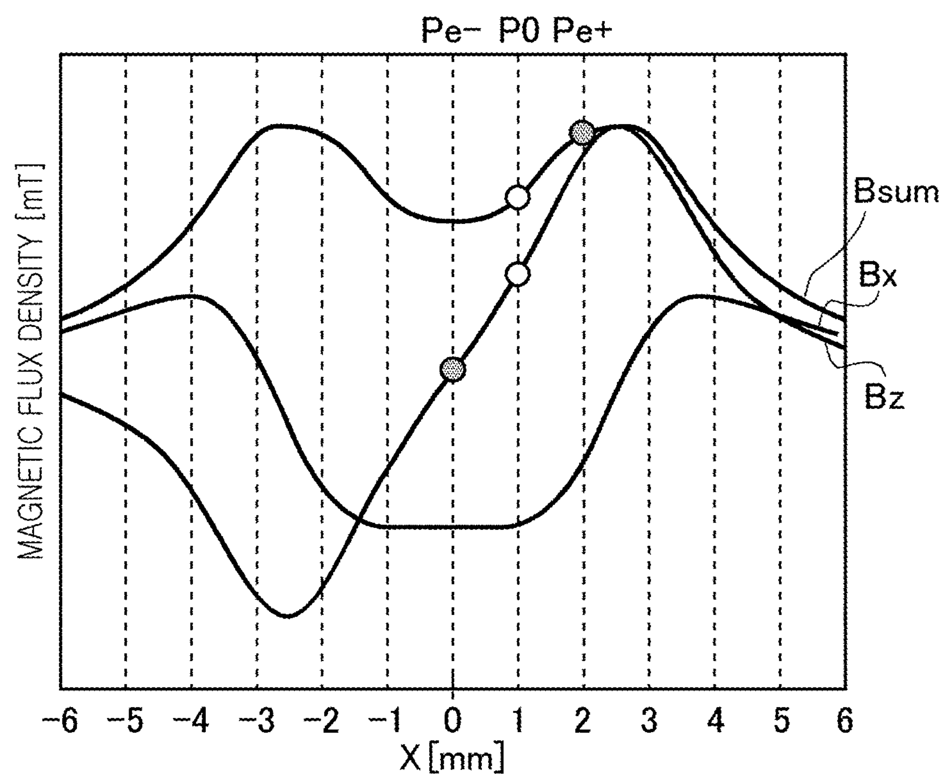
FIG. 7D shows an example of a more specific threshold value determination method.
Figure 7E:
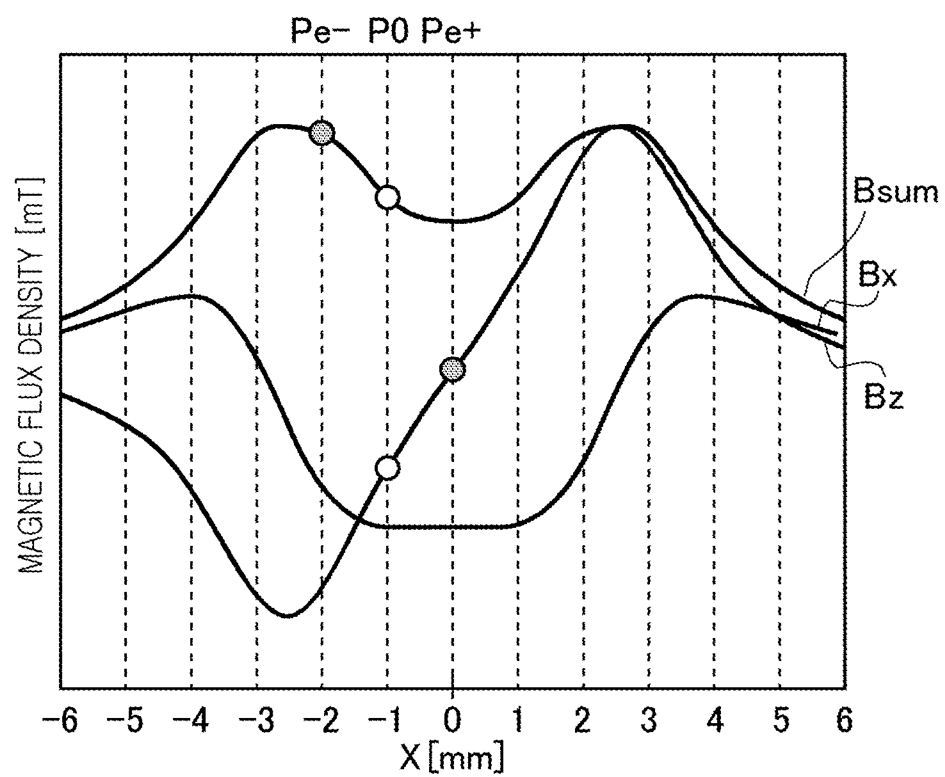
FIG. 7E shows an example of a more specific threshold value determination method.

FIG. 7D is a diagram showing a case where a reference position P0 is 1 mm for each waveform. In FIG. 7D, event detections are respectively performed by using Bsum for a trigger threshold value according to an event occurrence position Pe+ for a case where the magnetic-field generation unit 10 has moved to the plus side and by using Bz for a trigger threshold value according to an event occurrence position Pe− for a case where the magnetic-field generation unit 10 has moved to the minus side, so that an event can be detected even when only one trigger threshold value can be set for each detection axis FIG. 7E is a diagram showing a case where a reference position P0 is −1 mm. In FIG. 7E, event detections are respectively performed by using Bz for a trigger threshold value according to an event occurrence position Pe+ for a case where the magnetic-field generation unit 10 has moved to the plus side and by using Bsum for a trigger threshold value according to an event occurrence position Pe− for a case where the magnetic-field generation unit 10 has moved to the minus side, so that an event can be detected even when only one trigger threshold value can be set for each detection axis.

As described above, the event detection system 100 allows event detection in both directions by using the square-root of sum of squares Bsum of the magnetic flux density. This allows the event detection system 100 to determine a trigger threshold value to generate a trigger signal even when only one trigger threshold value can be set for a selected detection axis.

Further, in this embodiment, when only one trigger threshold value can be set for each detection axis, an event can be detected even when the magnetic sensor 20 cannot calculate the square-root of sum of squares Bsum of the magnetic flux density.

Figure 8A:
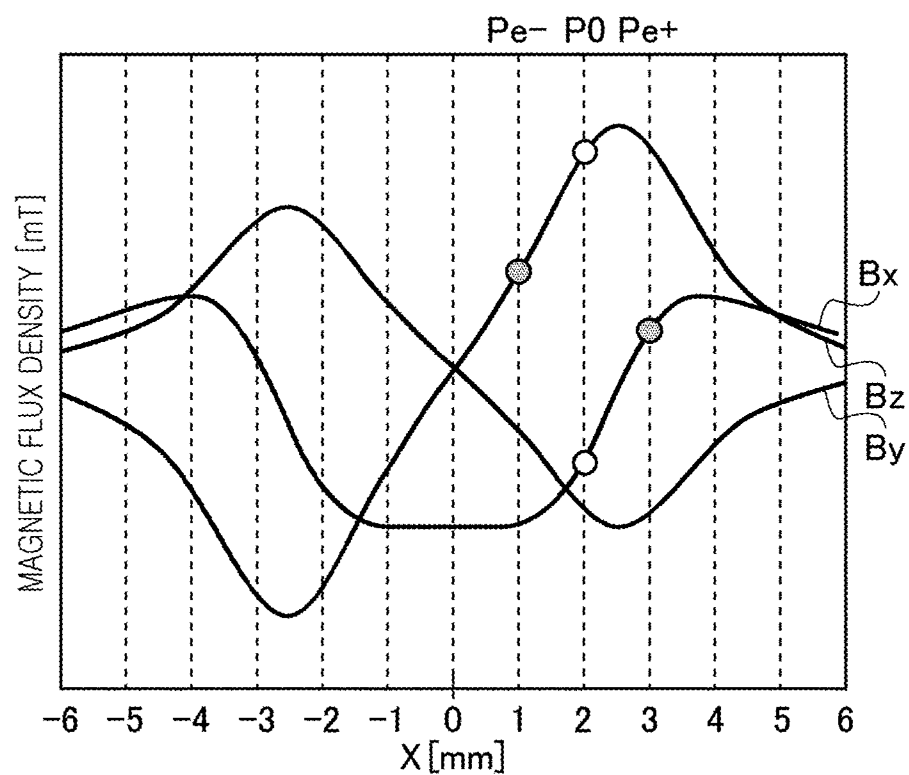
FIG. 8A shows an example of a more specific threshold value determination method.

FIG. 8A shows magnetic field waveforms according to a position of the magnetic-field generation unit 10, for a case where the magnetic-field generation unit 10 does not cross the magnetic sensor 20, as shown in FIG. 4C. The horizontal axis indicates a position of the magnetic-field generation unit 10 in the X-axis direction, while the vertical axis indicates a magnetic flux density Bx in the X-axis direction, a magnetic flux density By in the Y-axis direction, and a magnetic flux density Bz in the Z-axis direction. When the magnetic-field generation unit 10 has moved in the plus direction or the minus direction of the X axis near a reference position P0, if neither Bx nor Bz includes an inflection point, event detections can be performed for when the magnetic-field generation unit 10 has moved ±1 mm from the reference position P0.

For example, when the reference position P0 is 2 mm in FIG. 8A, the event detections are respectively performed by using Bx for a trigger threshold value according to an event occurrence position Pe+ for a case where the magnetic-field generation unit 10 has moved to the plus side and by using Bz for a trigger threshold value according to an event occurrence position Pe− for a case where the magnetic-field generation unit 10 has moved to the minus side, so that an event can be detected even when only one trigger threshold value can be set for each detection axis However, for example, when the reference position P0 is 0 mm in FIG. 8A, an event cannot be detected by using Bx because change in Bx is small at a periphery of the reference position P0. Even in such a case, an event can be detected by select the Y axis as the detection axis and using By.

Figure 8B:
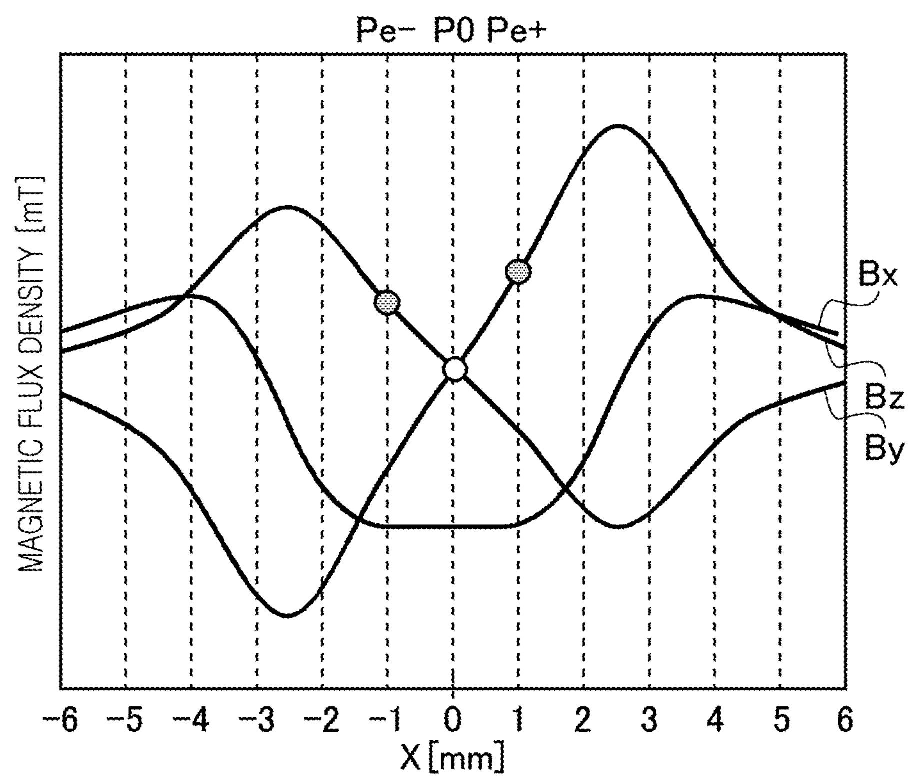
FIG. 8B shows an example of a more specific threshold value determination method.

FIG. 8B is a diagram showing a case where a reference position P0 is 0 mm. This example embodiment shows that event detections are respectively performed by using Bz for a trigger threshold value according to an event occurrence position Pe+ for a case where the magnetic-field generation unit 10 has moved to the plus side and by using By for a trigger threshold value according to an event occurrence position Pe− for a case where the magnetic-field generation unit 10 has moved to the minus side, so that an event can be detected even when only one trigger threshold value can be set for each detection axis, but the present invention is not limited thereto. That is, events can be respectively detected by using By for a trigger threshold value according to an event occurrence position Pe+ for a case where the magnetic-field generation unit 10 has moved to the plus side and by using Bz for a trigger threshold value according to an event occurrence position Pe− for a case where the magnetic-field generation unit 10 has moved to the minus side.

Figure 8C:
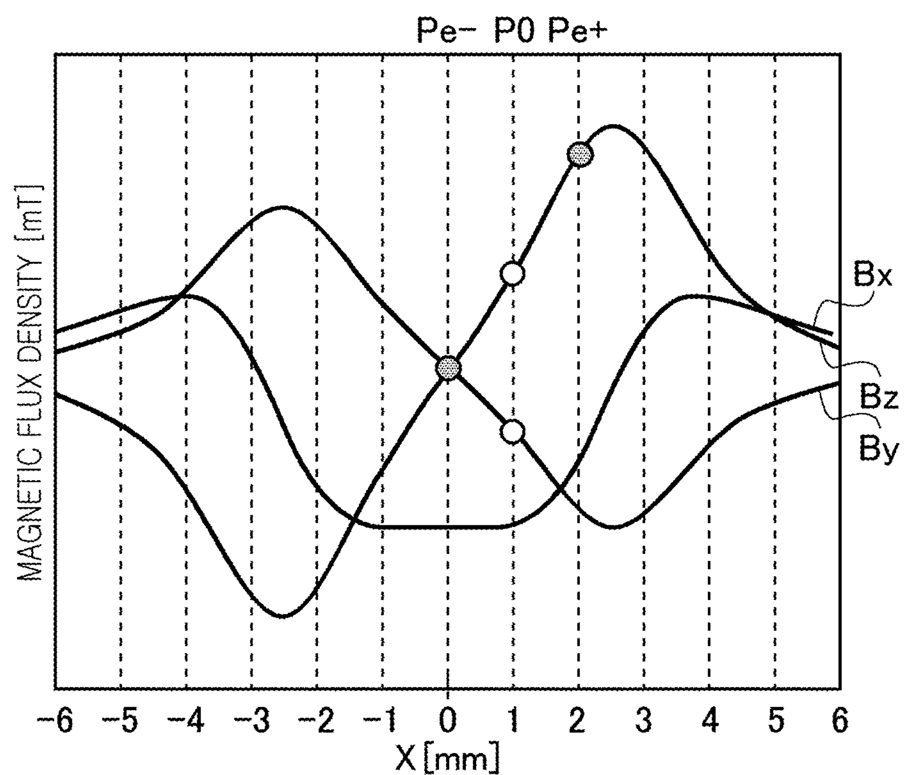
FIG. 8C shows an example of a more specific threshold value determination method.

FIG. 8C is a diagram showing a case where a reference position P0 is 1 mm. This example embodiment shows that event detections are respectively performed by using Bz for a trigger threshold value according to an event occurrence position Pe+ for a case where the magnetic-field generation unit 10 has moved to the plus side and by using By for a trigger threshold value according to an event occurrence position Pe− for a case where the magnetic-field generation unit 10 has moved to the minus side, so that an event can be detected even when only one trigger threshold value can be set for each detection axis, but the present invention is not limited thereto. That is, events can be respectively detected by using By for a trigger threshold value according to an event occurrence position Pe+ for a case where the magnetic-field generation unit 10 has moved to the plus side and by using Bz for a trigger threshold value according to an event occurrence position Pe− for a case where the magnetic-field generation unit 10 has moved to the minus side.

Figure 8D:
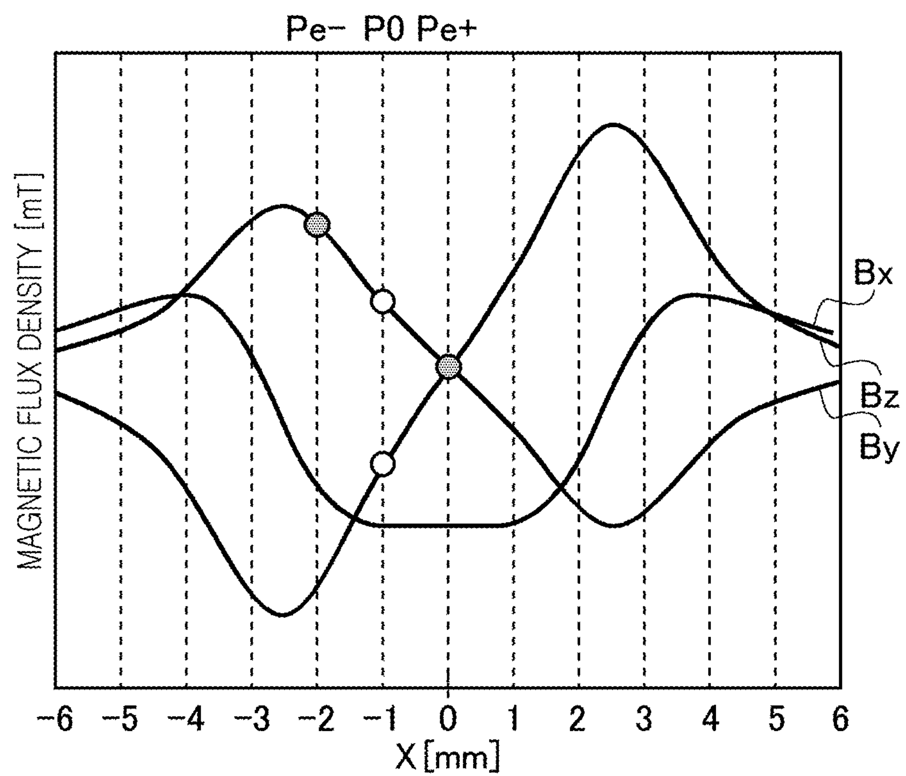
FIG. 8D shows an example of a more specific threshold value determination method.

FIG. 8D is a diagram showing a case where a reference position P0 is −1 mm. This example embodiment shows that event detections are respectively performed by using Bz for a trigger threshold value according to an event occurrence position Pe+ for a case where the magnetic-field generation unit 10 has moved to the plus side and by using By for a trigger threshold value according to an event occurrence position Pe− for a case where the magnetic-field generation unit 10 has moved to the minus side, so that an event can be detected even when only one trigger threshold value can be set for each detection axis, but the present invention is not limited thereto. That is, events can be respectively detected by using By for a trigger threshold value according to an event occurrence position Pe+ for a case where the magnetic-field generation unit 10 has moved to the plus side and by using Bz for a trigger threshold value according to an event occurrence position Pe− for a case where the magnetic-field generation unit 10 has moved to the minus side.

Figure 9:
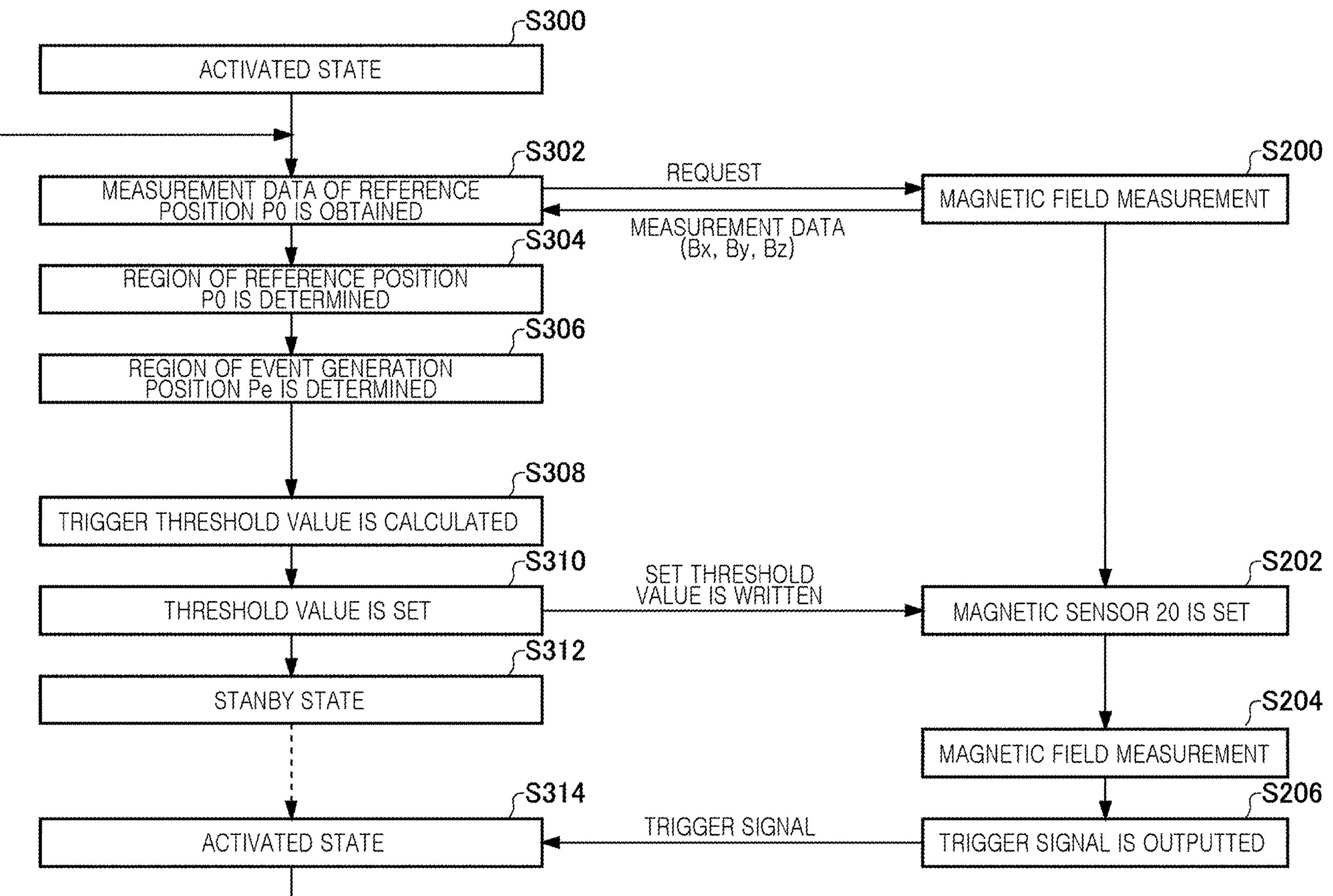
FIG. 9 shows an example of an operational flow of the event detection system 100.

FIG. 9 shows an example of an operational flow of the event detection system 100. This example shows a method of, after the processing unit 30 has shifted into a standby state, detecting a predetermined event to generate a trigger signal for activating the processing unit 30.

A step S300 to a step S314 may be executed by the processing unit 30, while the step S200 to the step S206 may be executed by the magnetic sensor 20. In the step S300, the processing unit 30 is set to an activated state. In the step S302, in order to obtain measurement data at a reference position P0 of the magnetic-field generation unit 10, the magnetic sensor 20 is requested to read the measurement data. As a result, the processing unit 30 obtains from the magnetic sensor 20 the measurement data (Bx, By, Bz) at the reference position P0. The reference position P0 of the magnetic-field generation unit 10 is not particularly limited.

In the step S304, the processing unit 30 determines a region of the reference position P0 of the magnetic-field generation unit 10 from the obtained measurement data. For example, the processing unit 30 calculates the reference position P0 of the magnetic-field generation unit 10 by using a data table or function fitting created in advance.

In the step S306, the processing unit 30 determines a region of an event occurrence position Pe. The processing unit 30 may store a preset event occurrence position Pe. The processing unit 30 may determine the region of the event occurrence position Pe from the measurement data for a case where the magnetic-field generation unit 10 is located at the event occurrence position Pe. In the step S308, the processing unit 30 calculates a trigger threshold value based on the event occurrence position Pe. The processing unit 30 may calculate the trigger threshold value by using the data table or function fitting created in advance.

In the step S310, the processing unit 30 writes the calculated trigger threshold value in the magnetic sensor 20. As a result, in the step S202, a detection axis to be used and the trigger threshold value are set in the magnetic sensor 20. For an axis not required for determination of the trigger threshold value, the magnetic sensor 20, without using it, does not have to detect a magnetic flux density. The magnetic sensor 20 measures a magnetic field, and when a magnetic flux density of the measured magnetic field exceeds or falls below the set trigger threshold value, the magnetic sensor 20 outputs the trigger signal to the processing unit 30 (the step S204, the step S206). Then, the processing unit 30 is activated by receiving the trigger signal (the step S314).

Figure 10:
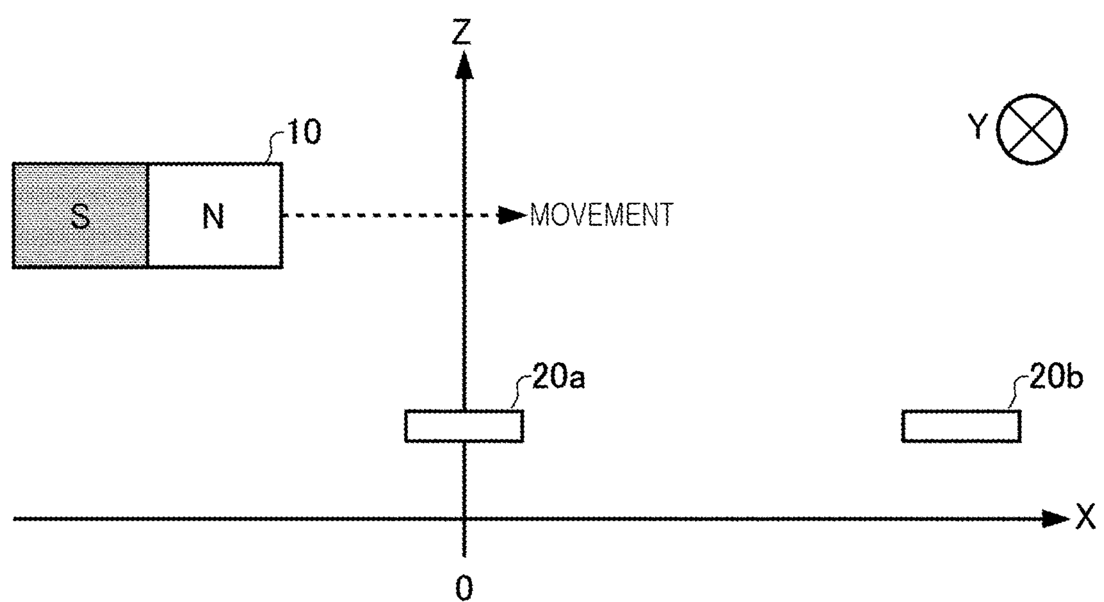
FIG. 10 shows an example of a configuration of the event detection system 100.

FIG. 10 shows an example of a configuration of the event detection system 100. The event detection system 100 in this example is different from the example embodiment in FIG. 2A in that the former is provided with a plurality of magnetic sensors 20. The event detection system 100 in this example is provided with two magnetic sensors 20: a magnetic sensor 20*a* and a magnetic sensor 20*b*.

The magnetic sensor 20*a* and the magnetic sensor 20*b* are arranged in the X-axis direction as a moving direction of the magnetic-field generation unit 10. The magnetic sensor 20*a* and the magnetic sensor 20*b* may be the same type of magnetic sensors or may be different types of magnetic sensors. The magnetic sensor 20*b* may or may not overlap with an event detectable region of the magnetic sensor 20*a*.

The event detection system 100 can further extend the event detectable region by providing a plurality of magnetic sensors 20. By similar processing to the processing of determining a detection axis when there is one magnetic sensor 20, the processing unit 30 may select a magnetic sensor 20 to be used and determine a detection axis from the selected magnetic sensor 20. This allows the event detection system 100 to use an optimal detection axis in an optimal magnetic sensor 20 according to the event occurrence position Pe.

Figure 11:
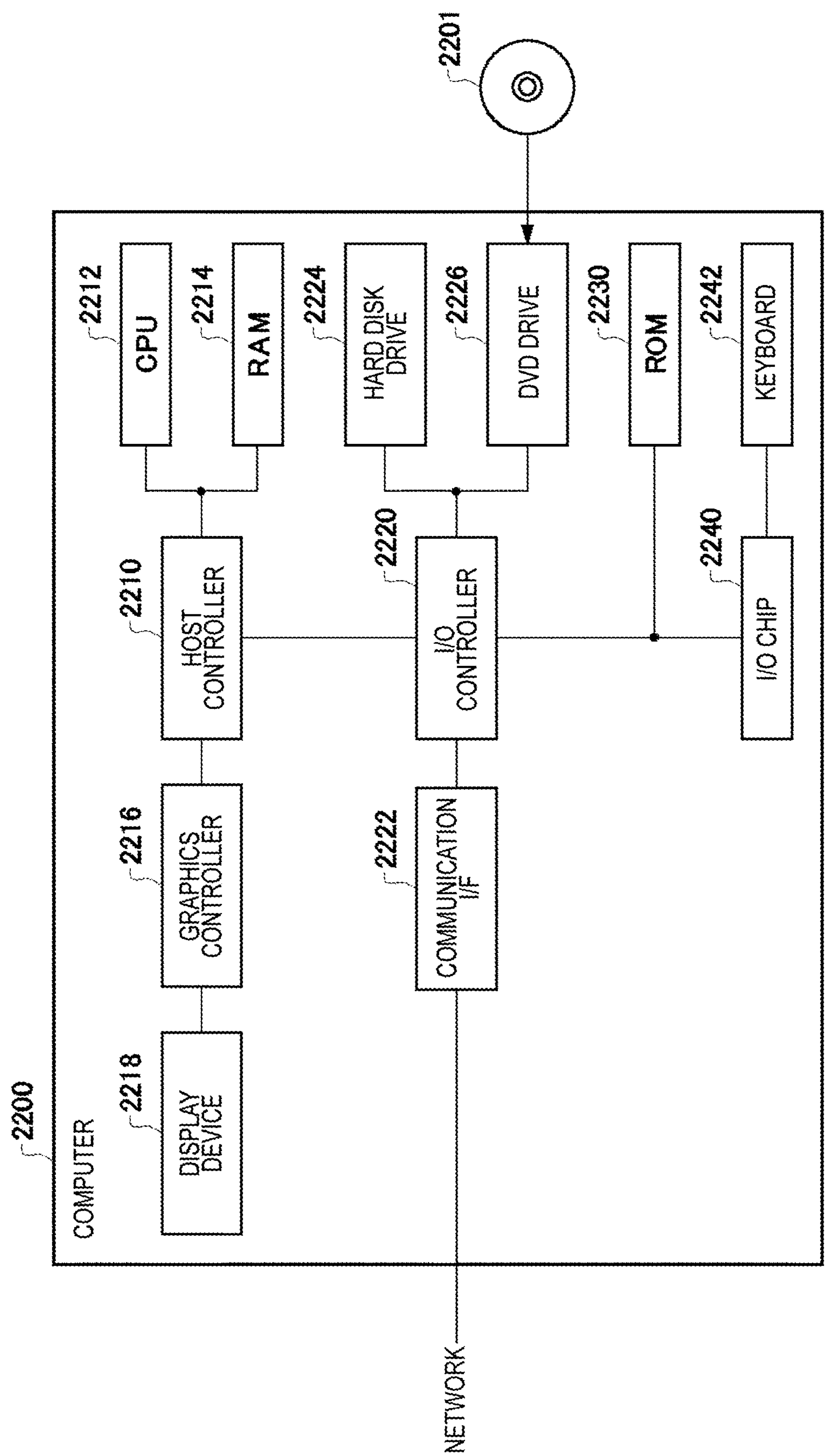
FIG. 11 shows an example of a computer 2200 in which a plurality of aspects of the present invention may be entirely or partially embodied.

FIG. 11 shows an example of a computer 2200 in which a plurality of aspects of the present invention may be entirely or partially embodied. A program that is installed in the computer 2200 can cause the computer 2200 to function as or execute operations associated with an apparatus according to the embodiments of the present invention or one or more sections thereof, or execute the operations or the one or more sections, and/or cause the computer 2200 to execute a process according to the embodiments of the present invention or steps of the process. Such a program may be executed by the CPU 2212 to cause the computer 2200 to execute certain operations associated with some or all of the blocks of flowcharts and block diagrams described herein.

The computer 2200 according to this embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates in accordance with programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units to the input/output controller 2220 via a parallel port, a serial port, a keyboard port, a mouse port, or the like.

A program is provided by a computer-readable medium such as the DVD-ROM 2201 or the IC card. The program is read from the computer-readable medium, installed into the hard disk drive 2224, RAM 2214, or ROM 2230, which are also examples of computer-readable medium, and executed by the CPU 2212. Information processing written in these programs is read by the computer 2200, and provides cooperation between the programs and the various types of hardware resources described above. An apparatus or method may be constituted by realizing the operation or processing of information in accordance with the usage of the computer 2200.

For example, when a communication is executed between the computer 2200 and an external device, the CPU 2212 may execute a communication program loaded in the RAM 2214, and instruct the communication interface 2222 to process the communication based on the processing written in the communication program. The communication interface 2222, under control of the CPU 2212, reads transmission data stored on a transmission buffer processing region provided in a recording medium such as the RAM 2214, the hard disk drive 2224, the DVD-ROM 2201, or the IC card, and sends the read transmission data to a network or writes reception data received from a network to a reception buffer processing region or the like provided on the recording medium.

Moreover, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and execute various types of processing on the data on the RAM 2214. Then, the CPU 2212 writes the processed data back in the external recording medium.

Various types of programs and various types of information such as data, a table, and a database may be stored in the recording medium, and subjected to information processing. The CPU 2212 may execute, on the data read from the RAM 2214, various types of processing including various types of operations, information processing, conditional judgement, conditional branching, unconditional branching, information retrieval/replacement, or the like described throughout the present disclosure and specified by instruction sequences of the programs, and writes the results back to the RAM 2214. Moreover, the CPU 2212 may retrieve information in a file, a database, or the like in the recording medium. For example, when a plurality of entries, each having an attribute value of a first attribute associated with an attribute value of a second attribute, are stored in the recording medium, the CPU 2212 may retrieve, out of said plurality of entries, an entry with the attribute value of the first attribute specified that meets a condition, read the attribute value of the second attribute stored in said entry, and thereby obtain the attribute value of the second attribute associated with the first attribute meeting a predetermined condition.

The above-described programs or software module may be stored on the computer 2200 or in the computer-readable medium in the vicinity of the computer 2200. Moreover, a recording medium such as a hard disk or RAM provided in a server system connected to a dedicated communication network or the Internet can be used as the computer-readable medium, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even when the process flow is described using phrases such as "first" or "next" in the claims, embodiments, or diagrams, it does not necessarily mean that the process must be performed in this order.

EXPLANATION OF REFERENCES

10: magnetic-field generation unit, 20: magnetic sensor, 22: detection unit, 24: output unit, 30: processing unit, 32: obtainment unit, 34: selection unit, 36: calculation unit, 100: event detection system, 2200: computer, 2201: DVD-ROM, 2210: host controller, 2212: CPU, 2214: RAM, 2216: graphics controller, 2218: display device, 2220: input/output controller, 2222: communication interface, 2224: hard disk drive, 2226: DVD-ROM drive, 2230: ROM, 2240: input/output chip, 2242: keyboard

What is claimed is:

1. An event detection method of detecting, by a multi-axis magnetic sensor, a magnetic field flux density in each axis of the multi-axis magnetic sensor generated by a magnetic-field generation unit and thereby detecting an anticipated event according to a position of the magnetic-field generation unit, the event detection method comprising:

presetting a position of the anticipated event relative to the multi-axis magnetic sensor;

selecting a detection axis for the event detection based on the preset position of the anticipated event;

calculating a trigger threshold value of the magnetic field flux density measurement signal of the selected detection axis at an occurrence of the anticipated event; and generating a trigger signal indicating that the magnetic field flux density detected by the multi-axis magnetic sensor and the trigger threshold value meet a predetermined condition.

2. The event detection method according to claim 1, further comprising:

moving the magnetic-field generation unit in a predetermined first direction; and selecting, as the detection axis, a first axis parallel to the first direction or a second axis orthogonal to the first axis.

3. The event detection method according to claim 2, wherein the moving the magnetic-field generation unit in the predetermined first direction includes moving, on the first axis or the second axis, the magnetic-field generation unit such that the magnetic-field generation unit passes over the magnetic sensor.

4. The event detection method according to claim 3, wherein the selecting the detection axis includes:

selecting the first axis when the position of the anticipated event belongs to a detectable region where a position of the magnetic-field generation unit can be detected on the first axis; and selecting the second axis when the position of the anticipated event does not belong to the detectable region on the first axis but belongs to a detectable region on the second axis.

5. The event detection method according to claim 3, further comprising:

obtaining a reference position of the magnetic-field generation unit; and selecting the detection axis based on the reference position and the position of the anticipated event.

6. The event detection method according to claim 2, wherein the selecting the detection axis includes:

selecting the first axis when the position of the anticipated event belongs to a detectable region where a position of the magnetic-field generation unit can be detected on the first axis; and selecting the second axis when the position of the anticipated event does not belong to the detectable region on the first axis but belongs to a detectable region on the second axis.

7. The event detection method according to claim 2, further comprising:

obtaining a reference position of the magnetic-field generation unit; and selecting the detection axis based on the reference position and the position of the anticipated event.

8. The event detection method according to claim 2, further comprising:

calculating a square-root of sum of squares of the magnetic field flux density detected by the multi-axis magnetic sensor; and using the square-root of sum of squares to calculate the trigger threshold value according to the position of the anticipated event.

9. The event detection method according to claim 1, further comprising:

obtaining a reference position of the magnetic-field generation unit; and selecting the detection axis based on the reference position and the position of the anticipated event.

10. The event detection method according to claim 1, further comprising:

calculating a square-root of sum of squares of the magnetic field flux density detected by the multi-axis magnetic sensor; and using the square-root of sum of squares to calculate the trigger threshold value according to the position of the anticipated event.

11. An event detection system comprising:

a magnetic-field generation unit configured to generate a predetermined magnetic field;

a multi-axis magnetic sensor for detecting a magnetic field flux density, generated by the magnetic field generation unit, in each axis of the multi-axis magnetic sensor; and a processing unit configured to process a magnetic field flux density measurement signal generated for each axis of the multi-axis magnetic sensor, wherein the processing unit includes:

an obtainment unit configured to preset a position of an anticipated event relative to the multi-axis magnetic sensor;

a selection unit configured to select a detection axis, from among a plurality of axes in the multi-axis magnetic sensor, for detecting an occurrence of the anticipated event;

a calculation unit configured to calculate a trigger threshold value of the magnetic field flux density measurement signal of the selected detection axis at an occurrence of the anticipated event; and an output unit configured to output a trigger signal indicating that the magnetic field flux density detected by the multi-axis magnetic sensor and the trigger threshold value meet a predetermined condition.

12. The event detection system according to claim 11, wherein the selection unit is configured to select, as the detection axis, a first axis parallel to a predetermined first direction in which the magnetic-field generation unit moves or a second axis orthogonal to the first axis.

13. The event detection system according to claim 12, wherein the magnetic-field generation unit has a north pole and a south pole arrayed in the first direction.

14. The event detection system according to claim 13, further comprising a plurality of magnetic sensors including the magnetic sensor arranged in the first direction.

15. The event detection system according to claim 12, further comprising a plurality of magnetic sensors including the magnetic sensor arranged in the first direction.

16. The event detection system according to claim 12, wherein the processing unit is configured to:

calculate a square-root of sum of squares of the magnetic field detected by the magnetic sensor; and use the square-root of sum of squares to calculate the trigger threshold value according to the preset position.

17. The event detection system according to claim 11, wherein the processing unit is configured to:

calculate a square-root of sum of squares of the magnetic field detected by the magnetic sensor; and use the square-root of sum or squares to calculate the trigger threshold value according to the preset position.

18. A non-transitory computer-readable recording medium having recorded thereon a program that causes a computer to execute an event detection method of detecting, by a multi-axis magnetic sensor, a magnetic field flux density in each axis of the multi-axis magnetic sensor generated by a magnetic-field generation unit and thereby detecting an anticipated event according to a position of the magnetic-field generation unit, the event detection method comprising:

presetting a position of the anticipated event relative to the multi-axis magnetic sensor;

selecting a detection axis for the event detection based on the preset position of the anticipated event;

calculating a trigger threshold value of the magnetic field flux density measurement signal of the selected detection axis at an occurrence of the anticipated event; and generating a trigger signal indicating that the magnetic field flux density detected by the multi-axis magnetic sensor and the trigger threshold value meet a predetermined condition.

* * * * *